US012671877B2

(12) United States Patent
Triplett et al.

(10) Patent No.: US 12,671,877 B2
(45) Date of Patent: **\*Jun. 30, 2026**

(54) REMOTE PLAYBACK QUEUE

(71) Applicant: Sonos, Inc., Santa Barbara, CA (US)

(72) Inventors: Mark Triplett, Hinsdale, IL (US);
Jonathan P. Lang, Santa Barbara, CA
(US); Hrishikesh Gossain, Santa
Barbara, CA (US)

(73) Assignee: Sonos, Inc., Goleta, CA (US)

( \* ) Notice: Subject to any disclaimer, the term of this
patent is extended or adjusted under 35
U.S.C. 154(b) by 0 days.

This patent is subject to a terminal dis-
claimer.

(21) Appl. No.: 18/514,424

(22) Filed: Nov. 20, 2023

(65) Prior Publication Data

US 2024/0323498 A1 Sep. 26, 2024

Related U.S. Application Data

(63) Continuation of application No. 17/686,237, filed on
Mar. 3, 2022, now Pat. No. 11,825,174, which is a
(Continued)

(51) Int. Cl.
*H04N 21/8352* (2011.01)
*G06F 3/0482* (2013.01)
(Continued)

(52) U.S. Cl.
CPC ....... *H04N 21/8352* (2013.01); *G06F 3/0482*
(2013.01); *G06F 3/165* (2013.01);
(Continued)

(58) Field of Classification Search
CPC ............. H04N 21/8352; H04N 21/233; H04N
21/26258; H04N 21/41407;
(Continued)

(56) References Cited

U.S. PATENT DOCUMENTS 5,406,634 A 4/1995 Anderson et al.
5,440,644 A 8/1995 Farinelli et al.
(Continued)

FOREIGN PATENT DOCUMENTS

AU 2012247286 B2 11/2015
CA 2842342 A1 2/2005
(Continued)

OTHER PUBLICATIONS

Notice of Allowance mailed on May 5, 2021, issued in connection
with U.S. Appl. No. 16/672,798, filed Nov. 4, 2019, 5 pages.
(Continued)

*Primary Examiner* — Leshui Zhang
(74) *Attorney, Agent, or Firm* — Akerman LLP

(57) ABSTRACT

Systems, methods, apparatus, and articles of manufacture to
facilitate discovery and remote configuration of content for
playback via a multimedia playback network are disclosed.
An example method includes facilitating identification of
multimedia content being played, the identification includ-
ing at least one of a content identifier associated with the
content and the content itself. An example method includes
relaying at least one of the content identifier and the content
to a playback system located remotely from a location of the
multimedia content playback, at least one of the content
identifier and the content remotely added for playback at the
playback system.

23 Claims, 9 Drawing Sheets

Related U.S. Application Data continuation of application No. 16/565,105, filed on Sep. 9, 2019, now abandoned, which is a continuation of application No. 15/131,018, filed on Apr. 17, 2016, now abandoned, which is a continuation of application No. 13/533,785, filed on Jun. 26, 2012, now Pat. No. 9,674,587.

(51) Int. Cl.

| | |
|---|---|
| *G06F 3/16* | (2006.01) |
| *G06F 16/635* | (2019.01) |
| *G06F 16/638* | (2019.01) |
| *G06F 16/68* | (2019.01) |
| *G06F 16/683* | (2019.01) |
| *H04N 21/233* | (2011.01) |
| *H04N 21/262* | (2011.01) |
| *H04N 21/414* | (2011.01) |
| *H04N 21/4227* | (2011.01) |
| *H04N 21/436* | (2011.01) |
| *H04N 21/45* | (2011.01) |
| *H04N 21/472* | (2011.01) |
| *H04N 21/482* | (2011.01) |
| *H04N 21/63* | (2011.01) |
| *H04N 21/81* | (2011.01) |

(52) U.S. Cl.
CPC .......... *G06F 16/635* (2019.01); *G06F 16/639* (2019.01); *G06F 16/68* (2019.01); *G06F 16/683* (2019.01); *H04N 21/233* (2013.01); *H04N 21/26258* (2013.01); *H04N 21/41407* (2013.01); *H04N 21/4227* (2013.01); *H04N 21/43615* (2013.01); *H04N 21/4524* (2013.01); *H04N 21/4532* (2013.01); *H04N 21/47217* (2013.01); *H04N 21/4825* (2013.01); *H04N 21/632* (2013.01); *H04N 21/8113* (2013.01)

(58) Field of Classification Search
CPC ......... H04N 21/4227; H04N 21/43615; H04N 21/4524; H04N 21/4532; H04N 21/47217; H04N 21/4825; H04N 21/632; H04N 21/8113; H04N 21/31; H04N 21/63; H04N 21/482; H04N 21/472; H04N 21/45; H04N 21/436; H04N 21/414; H04N 21/262; G06F 3/0482; G06F 3/16; G06F 3/165; G06F 3/167; G06F 3/0484; G06F 3/635; G06F 3/638; G06F 3/639; G06F 3/68; G06F 3/683; G06F 21/10; H04L 65/60; H04L 65/4084; H04L 65/4069; H04L 65/403; G10L 15/22; H04R 29/007
USPC ........ 725/78, 74, 75, 76, 80, 81, 89, 90, 92, 725/93, 95, 105, 109, 110, 114, 115, 116, 725/117; 381/77, 80, 81, 82, 86, 332, 381/334, 306, 302, 303, 311, 56, 61, 124; 700/94; 709/238; 707/769, E17.014
See application file for complete search history.

(56) References Cited

U.S. PATENT DOCUMENTS

| | | | |
|---|---|---|---|
| 5,616,876 A | 4/1997 | Cluts |
| 5,642,171 A | 6/1997 | Baumgartner et al. |
| 5,668,788 A | 9/1997 | Allison |
| 5,761,320 A | 6/1998 | Farinelli et al. |
| 5,856,827 A | 1/1999 | Sudo |
| 5,864,868 A | 1/1999 | Contois |
| 5,923,902 A | 7/1999 | Inagaki |
| 6,002,862 A | 12/1999 | Takaike |
| 6,032,202 A | 2/2000 | Lea et al. |
| 6,119,239 A | 9/2000 | Fujii |
| 6,122,749 A | 9/2000 | Gulick |
| 6,181,316 B1 | 1/2001 | Little et al. |
| 6,199,076 B1 | 3/2001 | Logan et al. |
| 6,255,961 B1 | 7/2001 | Van et al. |
| 6,256,554 B1 | 7/2001 | DiLorenzo |
| 6,404,811 B1 | 6/2002 | Cvetko et al. |
| 6,446,080 B1 | 9/2002 | Van Ryzin et al. |
| 6,449,118 B1 | 9/2002 | Choi et al. |
| 6,469,633 B1 | 10/2002 | Wachter |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,703,940 B1 | 3/2004 | Allen et al. |
| 6,721,489 B1 | 4/2004 | Benyamin et al. |
| 6,728,531 B1 | 4/2004 | Lee et al. |
| 6,731,760 B2 | 5/2004 | Pedersen |
| 6,732,155 B2 | 5/2004 | Meek |
| 6,757,517 B2 | 6/2004 | Chang |
| 6,778,869 B2 | 8/2004 | Champion |
| 6,826,283 B1 | 11/2004 | Wheeler et al. |
| 6,832,293 B1 | 12/2004 | Tagawa et al. |
| 6,910,078 B1 | 6/2005 | Raman et al. |
| 6,976,087 B1 | 12/2005 | Westfall et al. |
| 6,985,694 B1 | 1/2006 | De Bonet et al. |
| 7,017,118 B1 | 3/2006 | Carroll |
| 7,020,048 B2 | 3/2006 | McComas |
| 7,020,704 B1 | 3/2006 | Lipscomb et al. |
| 7,113,833 B1 | 9/2006 | Brown et al. |
| 7,117,451 B2 | 10/2006 | Sielken |
| 7,130,608 B2 | 10/2006 | Hollstrom et al. |
| 7,130,616 B2 | 10/2006 | Janik |
| 7,143,939 B2 | 12/2006 | Henzerling |
| 7,178,106 B2 | 2/2007 | Lamkin et al. |
| 7,187,947 B1 | 3/2007 | White et al. |
| 7,236,773 B2 | 6/2007 | Thomas |
| 7,269,338 B2 | 9/2007 | Janevski |
| 7,295,548 B2 | 11/2007 | Blank et al. |
| 7,308,489 B2 | 12/2007 | Weast |
| 7,312,785 B2 | 12/2007 | Tsuk et al. |
| 7,313,384 B1 | 12/2007 | Meenan et al. |
| 7,358,960 B2 | 4/2008 | Mak |
| 7,391,791 B2 | 6/2008 | Balassanian et al. |
| 7,430,181 B1 | 9/2008 | Hong |
| 7,454,511 B2 | 11/2008 | Weast |
| 7,483,538 B2 | 1/2009 | McCarty et al. |
| 7,509,181 B2 | 3/2009 | Champion |
| 7,571,014 B1 | 8/2009 | Lambourne et al. |
| 7,571,244 B2 | 8/2009 | Costanzo et al. |
| 7,583,886 B2 | 9/2009 | Komi et al. |
| 7,617,278 B1 | 11/2009 | Edelman et al. |
| 7,630,501 B2 | 12/2009 | Blank et al. |
| 7,631,119 B2 | 12/2009 | Moore et al. |
| 7,643,894 B2 | 1/2010 | Braithwaite et al. |
| 7,647,613 B2 | 1/2010 | Drakoulis et al. |
| 7,657,910 B1 | 2/2010 | McAulay et al. |
| 7,668,939 B2 | 2/2010 | Encarnacion et al. |
| 7,668,964 B2 | 2/2010 | Millington |
| 7,689,304 B2 | 3/2010 | Sasaki |
| 7,702,279 B2 | 4/2010 | Ko et al. |
| 7,716,699 B2 | 5/2010 | Evans et al. |
| 7,720,686 B2 | 5/2010 | Volk et al. |
| 7,725,533 B2 | 5/2010 | Szeto et al. |
| 7,725,551 B2 | 5/2010 | Szeto et al. |
| 7,742,740 B2 | 6/2010 | Goldberg et al. |
| 7,765,315 B2 | 7/2010 | Batson et al. |
| 7,770,314 B2 | 8/2010 | Dean |
| 7,792,524 B2 | 9/2010 | Struthers et al. |
| 7,792,920 B2 | 9/2010 | Istvan et al. |
| 7,796,190 B2 | 9/2010 | Basso et al. |
| 7,797,446 B2 | 9/2010 | Heller et al. |
| 7,797,719 B2 | 9/2010 | Drakoulis et al. |
| 7,805,682 B1 | 9/2010 | Lambourne |
| 7,827,259 B2 | 11/2010 | Heller et al. |
| 7,831,928 B1 | 11/2010 | Rose et al. |
| 7,853,341 B2 | 12/2010 | McCarty et al. |
| 7,895,633 B2 | 2/2011 | Van Hoff et al. |

(56) References Cited

U.S. PATENT DOCUMENTS

| | | | |
|---|---|---|---|
| 7,958,441 B2 | 6/2011 | Heller et al. |
| 7,983,614 B2 | 7/2011 | Dunko et al. |
| 7,987,294 B2 | 7/2011 | Bryce et al. |
| 8,014,423 B2 | 9/2011 | Thaler et al. |
| 8,028,323 B2 | 9/2011 | Weel |
| 8,041,438 B2 | 10/2011 | Batson et al. |
| 8,045,952 B2 | 10/2011 | Qureshey et al. |
| 8,050,652 B2 | 11/2011 | Qureshey et al. |
| 8,055,364 B2 | 11/2011 | Champion |
| 8,060,225 B2 | 11/2011 | Hans et al. |
| 8,060,407 B1 | 11/2011 | Delker et al. |
| 8,072,905 B2 | 12/2011 | Haff et al. |
| 8,074,253 B1 | 12/2011 | Nathan |
| 8,099,313 B2 | 1/2012 | Messer et al. |
| 8,103,009 B2 | 1/2012 | McCarty et al. |
| 8,107,639 B2 | 1/2012 | Moeller et al. |
| 8,111,132 B2 | 2/2012 | Allen et al. |
| 8,131,390 B2 | 3/2012 | Braithwaite et al. |
| 8,140,974 B2 | 3/2012 | Hayter et al. |
| 8,148,622 B2 | 4/2012 | Rothkopf et al. |
| 8,156,236 B2 | 4/2012 | Costanzo et al. |
| 8,156,435 B2 | 4/2012 | Wohlert |
| 8,184,641 B2 | 5/2012 | Alt et al. |
| 8,204,890 B1 | 6/2012 | Gogan |
| 8,214,740 B2 | 7/2012 | Johnson |
| 8,214,873 B2 | 7/2012 | Weel |
| 8,230,099 B2 | 7/2012 | Weel |
| 8,234,395 B2 | 7/2012 | Millington |
| 8,290,603 B1 | 10/2012 | Lambourne |
| 8,316,154 B2 | 11/2012 | Yoneda et al. |
| 8,364,296 B2 | 1/2013 | Wilhelm |
| 8,401,681 B2 | 3/2013 | Rosenblatt et al. |
| 8,407,623 B2 | 3/2013 | Kerr et al. |
| 8,423,893 B2 | 4/2013 | Ramsay et al. |
| 8,438,131 B2 | 5/2013 | Prorock et al. |
| 8,468,426 B2 | 6/2013 | Bims |
| 8,473,993 B2 | 6/2013 | Athias |
| 8,483,853 B1 | 7/2013 | Lambourne |
| 8,533,469 B2 | 9/2013 | Song et al. |
| 8,544,046 B2 | 9/2013 | Gran et al. |
| 8,588,949 B2 | 11/2013 | Lambourne et al. |
| 8,601,394 B2 | 12/2013 | Sheehan et al. |
| 8,611,317 B2 | 12/2013 | Banerjea et al. |
| 8,611,559 B2 | 12/2013 | Sanders |
| 8,681,822 B2 | 3/2014 | Bradley et al. |
| 8,688,431 B2 | 4/2014 | Lyons et al. |
| 8,688,991 B1 | 4/2014 | Sunil |
| 8,724,600 B2 | 5/2014 | Ramsay et al. |
| 8,750,677 B2 | 6/2014 | Brown et al. |
| 8,797,926 B2 | 8/2014 | Kearney, III et al. |
| 8,799,395 B2 | 8/2014 | Seidel et al. |
| 8,799,496 B2 | 8/2014 | Phillips et al. |
| 8,805,963 B2 | 8/2014 | Pantos et al. |
| 8,818,538 B2 | 8/2014 | Sakata |
| 8,843,586 B2 | 9/2014 | Pantos et al. |
| 8,850,481 B2 | 9/2014 | Shannon et al. |
| 8,856,847 B2 | 10/2014 | Soroushian |
| 8,880,648 B1 | 11/2014 | Arora et al. |
| 8,892,691 B2 | 11/2014 | Pantos et al. |
| 8,935,580 B2 | 1/2015 | Bims |
| 8,938,675 B2 | 1/2015 | Holladay et al. |
| 8,942,252 B2 | 1/2015 | Balassanian et al. |
| 8,954,177 B2 | 2/2015 | Sanders |
| 8,965,544 B2 | 2/2015 | Ramsay |
| 8,966,394 B2 | 2/2015 | Gates et al. |
| 8,971,914 B2 | 3/2015 | Ortiz |
| 8,972,860 B2 | 3/2015 | Corbett et al. |
| 9,084,089 B2 | 7/2015 | Ng et al. |
| 9,124,607 B2 | 9/2015 | Monteiro et al. |
| 9,137,602 B2 | 9/2015 | Mayman et al. |
| 9,141,616 B2 | 9/2015 | Britt, Jr. et al. |
| 9,154,185 B2 | 10/2015 | Warren et al. |
| 9,179,199 B2 | 11/2015 | Alsina et al. |
| 9,195,775 B2 | 11/2015 | Al-Shaykh et al. |
| 9,232,279 B2 | 1/2016 | Beeson et al. |
| 9,241,355 B2 | 1/2016 | Schulert et al. |
| 9,286,384 B2 | 3/2016 | Kuper et al. |
| 9,318,152 B2 | 4/2016 | Kretz et al. |
| 9,319,815 B2 | 4/2016 | Warren et al. |
| 9,338,206 B2 | 5/2016 | Keum et al. |
| 9,374,607 B2 | 6/2016 | Bates et al. |
| 9,380,414 B2 | 6/2016 | Ortiz |
| 9,386,063 B2 | 7/2016 | McMahon et al. |
| 9,397,627 B2 | 7/2016 | Qureshey et al. |
| 9,451,319 B2 | 9/2016 | Maitre et al. |
| 9,460,631 B2 | 10/2016 | Reilly et al. |
| 9,484,030 B1 | 11/2016 | Meaney et al. |
| 9,490,998 B1 | 11/2016 | Danciu et al. |
| 9,507,780 B2 | 11/2016 | Rothkopf et al. |
| 9,547,650 B2 | 1/2017 | Eyal et al. |
| 9,563,703 B2 | 2/2017 | Nijim et al. |
| 9,565,240 B2 | 2/2017 | Sparks |
| 9,609,448 B2 | 3/2017 | Bentley et al. |
| 9,626,363 B2 | 4/2017 | Rosenblatt et al. |
| 9,635,068 B2 | 4/2017 | Garmark et al. |
| 9,665,339 B2 | 5/2017 | Reimann et al. |
| 9,690,466 B2 | 6/2017 | Coburn et al. |
| 9,699,232 B2 | 7/2017 | Drapeau et al. |
| 9,735,978 B2 | 8/2017 | Kumar et al. |
| 9,788,048 B2 | 10/2017 | Collart et al. |
| 9,798,514 B2 | 10/2017 | Silva et al. |
| 9,819,717 B2 | 11/2017 | Oyman et al. |
| 9,826,306 B2 | 11/2017 | Lang |
| 9,846,767 B2 | 12/2017 | Britt, Jr. et al. |
| 9,882,995 B2 | 1/2018 | Van Erven et al. |
| 9,888,276 B2 | 2/2018 | Bolin |
| 9,967,615 B2 | 5/2018 | Coburn, IV et al. |
| 9,977,561 B2 | 5/2018 | Bates et al. |
| 10,175,932 B2 | 1/2019 | Millington |
| 10,191,980 B2 | 1/2019 | Kumar et al. |
| 10,191,981 B2 | 1/2019 | Kumar et al. |
| 10,268,352 B2 | 4/2019 | Coburn, IV et al. |
| 10,270,612 B2 | 4/2019 | Reimann et al. |
| 10,313,754 B2 | 6/2019 | Mudd et al. |
| 10,469,897 B2 | 11/2019 | Reimann et al. |
| 10,484,806 B2 | 11/2019 | Warren et al. |
| 10,587,780 B2 | 3/2020 | Godfrey et al. |
| 10,687,161 B2 | 6/2020 | Proctor, Jr. et al. |
| 10,771,274 B2 | 9/2020 | Reimann et al. |
| 10,818,290 B2 | 10/2020 | Lambourne |
| 11,132,170 B2 | 9/2021 | Lambourne |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0059637 A1 | 5/2002 | Rakib |
| 2002/0124097 A1 | 9/2002 | Isely et al. |
| 2002/0165721 A1 | 11/2002 | Chang et al. |
| 2002/0165921 A1 | 11/2002 | Sapieyevski |
| 2002/0173273 A1 | 11/2002 | Spurgat et al. |
| 2002/0174243 A1 | 11/2002 | Spurgat et al. |
| 2002/0174269 A1 | 11/2002 | Spurgat et al. |
| 2002/0178191 A1 | 11/2002 | Sielken |
| 2002/0188461 A1 | 12/2002 | Matsumoto |
| 2002/0194309 A1 | 12/2002 | Carter et al. |
| 2003/0011635 A1 | 1/2003 | Hasha et al. |
| 2003/0023741 A1 | 1/2003 | Tomassetti et al. |
| 2003/0079038 A1 | 4/2003 | Robbin et al. |
| 2003/0126211 A1 | 7/2003 | Anttila et al. |
| 2003/0157951 A1 | 8/2003 | Hasty, Jr. |
| 2003/0198257 A1 | 10/2003 | Sullivan et al. |
| 2003/0210796 A1 | 11/2003 | McCarty et al. |
| 2003/0221541 A1 | 12/2003 | Platt |
| 2003/0225834 A1 | 12/2003 | Lee et al. |
| 2004/0024478 A1 | 2/2004 | Hans et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0114036 A1 | 6/2004 | Karaoguz et al. |
| 2004/0114579 A1 | 6/2004 | Karaoguz et al. |
| 2004/0117846 A1 | 6/2004 | Karaoguz et al. |
| 2004/0138948 A1 | 7/2004 | Loomis |
| 2004/0193402 A1 | 9/2004 | Nolan et al. |
| 2004/0215611 A1 | 10/2004 | Jawa et al. |

(56) References Cited

U.S. PATENT DOCUMENTS

| | | |
|---|---|---|
| 2004/0261040 A1 | 12/2004 | Radcliffe et al. |
| 2005/0028225 A1 | 2/2005 | Dawson et al. |
| 2005/0108320 A1 | 5/2005 | Lord et al. |
| 2005/0138193 A1 | 6/2005 | Encarnacion et al. |
| 2005/0152557 A1 | 7/2005 | Sasaki et al. |
| 2005/0155072 A1 | 7/2005 | Kaczowka et al. |
| 2005/0166157 A1 | 7/2005 | Ollis et al. |
| 2005/0177624 A1 | 8/2005 | Oswald et al. |
| 2005/0215239 A1 | 9/2005 | Kopra et al. |
| 2005/0216855 A1 | 9/2005 | Kopra et al. |
| 2005/0235334 A1 | 10/2005 | Togashi et al. |
| 2005/0240494 A1 | 10/2005 | Cue et al. |
| 2005/0251566 A1 | 11/2005 | Weel |
| 2005/0251807 A1 | 11/2005 | Weel |
| 2005/0262204 A1 | 11/2005 | Szeto et al. |
| 2005/0262253 A1 | 11/2005 | Li et al. |
| 2005/0262254 A1 | 11/2005 | Sherwani |
| 2005/0273790 A1 | 12/2005 | Kearney, III et al. |
| 2006/0002681 A1 | 1/2006 | Spilo et al. |
| 2006/0008256 A1 | 1/2006 | Khedouri et al. |
| 2006/0041577 A1 | 2/2006 | Ellicott et al. |
| 2006/0041639 A1 | 2/2006 | Lamkin et al. |
| 2006/0062094 A1 | 3/2006 | Nathan et al. |
| 2006/0107237 A1 | 5/2006 | Kim |
| 2006/0153040 A1 | 7/2006 | Girish et al. |
| 2006/0156236 A1 | 7/2006 | Heller et al. |
| 2006/0159109 A1 | 7/2006 | Lamkin et al. |
| 2006/0168340 A1 | 7/2006 | Heller et al. |
| 2006/0195480 A1 | 8/2006 | Spiegelman et al. |
| 2006/0195521 A1 | 8/2006 | New et al. |
| 2006/0195864 A1 | 8/2006 | New et al. |
| 2006/0206340 A1 | 9/2006 | Silvera et al. |
| 2006/0218294 A1 | 9/2006 | Rosenberg |
| 2006/0242106 A1 | 10/2006 | Bank |
| 2006/0253782 A1 | 11/2006 | Stark et al. |
| 2006/0258289 A1 | 11/2006 | Dua |
| 2006/0263048 A1 | 11/2006 | Sato et al. |
| 2006/0265654 A1 | 11/2006 | Nakamura et al. |
| 2006/0294201 A1 | 12/2006 | Kito et al. |
| 2007/0015457 A1 | 1/2007 | Krampf et al. |
| 2007/0022207 A1 | 1/2007 | Millington |
| 2007/0038999 A1 | 2/2007 | Millington |
| 2007/0053514 A1 | 3/2007 | Imai et al. |
| 2007/0061725 A1 | 3/2007 | Isaac et al. |
| 2007/0067808 A1 | 3/2007 | DaCosta |
| 2007/0083897 A1 | 4/2007 | Brownell |
| 2007/0086724 A1 | 4/2007 | Grady et al. |
| 2007/0105631 A1* | 5/2007 | Herr .......................... G10L 19/24 |
| | | 704/E19.044 |
| 2007/0106672 A1 | 5/2007 | Sighart et al. |
| 2007/0106726 A1 | 5/2007 | Rosenberg |
| 2007/0116316 A1 | 5/2007 | Goldberg |
| 2007/0136488 A1 | 6/2007 | Cho et al. |
| 2007/0136778 A1 | 6/2007 | Birger et al. |
| 2007/0142944 A1 | 6/2007 | Goldberg et al. |
| 2007/0169087 A1 | 7/2007 | Fadell |
| 2007/0214182 A1* | 9/2007 | Rosenberg ............ G06F 16/635 |
| 2007/0220150 A1 | 9/2007 | Garg |
| 2007/0250900 A1 | 10/2007 | Marcuvitz |
| 2007/0266065 A1 | 11/2007 | Rosenberg et al. |
| 2007/0271525 A1 | 11/2007 | Han et al. |
| 2007/0276928 A1 | 11/2007 | Rhoads et al. |
| 2007/0288470 A1 | 12/2007 | Kauniskangas et al. |
| 2008/0005690 A1 | 1/2008 | Van Vugt |
| 2008/0010372 A1 | 1/2008 | Khedouri et al. |
| 2008/0016465 A1 | 1/2008 | Foxenland |
| 2008/0018625 A1 | 1/2008 | Ijichi et al. |
| 2008/0025535 A1 | 1/2008 | Rajapakse |
| 2008/0057922 A1 | 3/2008 | Kokes et al. |
| 2008/0059567 A1 | 3/2008 | Williams et al. |
| 2008/0065722 A1 | 3/2008 | Brodersen et al. |
| 2008/0085098 A1 | 4/2008 | Ullmann |
| 2008/0086379 A1 | 4/2008 | Dion et al. |
| 2008/0109852 A1 | 5/2008 | Kretz et al. |
| 2008/0109867 A1 | 5/2008 | Panabaker et al. |
| 2008/0120501 A1 | 5/2008 | Jannink et al. |
| 2008/0133715 A1 | 6/2008 | Yoneda et al. |
| 2008/0133763 A1 | 6/2008 | Clark et al. |
| 2008/0134256 A1 | 6/2008 | Dacosta |
| 2008/0157991 A1 | 7/2008 | Raghunath et al. |
| 2008/0162668 A1 | 7/2008 | Miller |
| 2008/0175394 A1* | 7/2008 | Goodwin ................ H04S 3/008 |
| | | 381/1 |
| 2008/0177822 A1 | 7/2008 | Yoneda |
| 2008/0178296 A1* | 7/2008 | Lemmers ......... G11B 20/00086 |
| 2008/0183840 A1 | 7/2008 | Khedouri et al. |
| 2008/0195239 A1 | 8/2008 | Rotholtz et al. |
| 2008/0209487 A1 | 8/2008 | Osann et al. |
| 2008/0215169 A1 | 9/2008 | Debettencourt et al. |
| 2008/0218409 A1 | 9/2008 | Moinzadeh et al. |
| 2008/0221715 A1 | 9/2008 | Krzyzanowski et al. |
| 2008/0242222 A1 | 10/2008 | Bryce et al. |
| 2008/0243278 A1 | 10/2008 | Dalton et al. |
| 2008/0254751 A1 | 10/2008 | Lazaridis |
| 2008/0291916 A1 | 11/2008 | Xiong et al. |
| 2008/0292120 A1 | 11/2008 | Wilson |
| 2008/0320543 A1 | 12/2008 | Wang et al. |
| 2009/0006542 A1 | 1/2009 | Feldman et al. |
| 2009/0006643 A1 | 1/2009 | Lee |
| 2009/0006968 A1 | 1/2009 | Trask |
| 2009/0030978 A1 | 1/2009 | Johnson et al. |
| 2009/0059512 A1 | 3/2009 | Lydon et al. |
| 2009/0061764 A1 | 3/2009 | Lockhart et al. |
| 2009/0063627 A1 | 3/2009 | Nowacek |
| 2009/0063975 A1 | 3/2009 | Bull et al. |
| 2009/0097818 A1 | 4/2009 | Hirata |
| 2009/0099919 A1 | 4/2009 | Schultheiss et al. |
| 2009/0113053 A1 | 4/2009 | Van Wie et al. |
| 2009/0132712 A1 | 5/2009 | P et al. |
| 2009/0150491 A1 | 6/2009 | Yamamoto |
| 2009/0171487 A1 | 7/2009 | Wilhelm |
| 2009/0172542 A1 | 7/2009 | Girish et al. |
| 2009/0197524 A1 | 8/2009 | Haff et al. |
| 2009/0198356 A1* | 8/2009 | Goodwin .............. G10L 19/008 |
| | | 700/94 |
| 2009/0222392 A1 | 9/2009 | Martin et al. |
| 2009/0228123 A1 | 9/2009 | Fontijn |
| 2009/0228897 A1 | 9/2009 | Murray et al. |
| 2009/0228919 A1 | 9/2009 | Zott et al. |
| 2009/0248702 A1 | 10/2009 | Schwartz et al. |
| 2009/0249222 A1 | 10/2009 | Schmidt et al. |
| 2009/0259765 A1 | 10/2009 | Karlsson et al. |
| 2009/0265164 A1* | 10/2009 | Yoon ..................... G10L 19/008 |
| | | 704/200 |
| 2009/0275285 A1 | 11/2009 | Maricevic et al. |
| 2009/0296702 A1* | 12/2009 | Stevens ................. H04L 45/306 |
| | | 370/389 |
| 2009/0323991 A1 | 12/2009 | Hudson et al. |
| 2010/0005496 A1 | 1/2010 | Ellis et al. |
| 2010/0009674 A1 | 1/2010 | Sapkota et al. |
| 2010/0023578 A1 | 1/2010 | Brant et al. |
| 2010/0027966 A1 | 2/2010 | Harrang et al. |
| 2010/0031366 A1 | 2/2010 | Knight et al. |
| 2010/0042235 A1 | 2/2010 | Basso et al. |
| 2010/0061197 A1 | 3/2010 | Yoshikawa et al. |
| 2010/0082567 A1 | 4/2010 | Rosenblatt et al. |
| 2010/0082725 A1 | 4/2010 | Onishi |
| 2010/0082731 A1 | 4/2010 | Haughay et al. |
| 2010/0082784 A1 | 4/2010 | Rosenblatt et al. |
| 2010/0087214 A1 | 4/2010 | Bournel et al. |
| 2010/0093393 A1 | 4/2010 | Graef |
| 2010/0094833 A1 | 4/2010 | Svendsen et al. |
| 2010/0095332 A1 | 4/2010 | Gran et al. |
| 2010/0110200 A1 | 5/2010 | Lau et al. |
| 2010/0114979 A1 | 5/2010 | Petersen |
| 2010/0121891 A1 | 5/2010 | Zampiello |
| 2010/0131567 A1 | 5/2010 | Dorogusker et al. |
| 2010/0131978 A1 | 5/2010 | Friedlander et al. |
| 2010/0138780 A1 | 6/2010 | Marano et al. |
| 2010/0142725 A1 | 6/2010 | Goldstein et al. |
| 2010/0162117 A1 | 6/2010 | Basso et al. |
| 2010/0162324 A1 | 6/2010 | Mehta et al. |
| 2010/0178873 A1 | 7/2010 | Lee et al. |
| 2010/0198767 A1 | 8/2010 | Farrelly |

(56)　　　　References Cited

U.S. PATENT DOCUMENTS

| | | |
|---|---|---|
| 2010/0198944 A1 | 8/2010 | Ho et al. |
| 2010/0206815 A1 | 8/2010 | Garusi et al. |
| 2010/0211438 A1 | 8/2010 | Lutnick et al. |
| 2010/0211693 A1 | 8/2010 | Master et al. |
| 2010/0228740 A1 | 9/2010 | Cannistraro et al. |
| 2010/0250669 A1 | 9/2010 | Pan |
| 2010/0268360 A1 | 10/2010 | Ingrassia et al. |
| 2010/0284389 A1 | 11/2010 | Ramsay et al. |
| 2010/0299402 A1 | 11/2010 | Korman et al. |
| 2010/0299639 A1 | 11/2010 | Ramsay et al. |
| 2010/0303244 A1 | 12/2010 | Kim et al. |
| 2010/0306815 A1 | 12/2010 | Emerson et al. |
| 2010/0312817 A1 | 12/2010 | Steakley |
| 2010/0318917 A1 | 12/2010 | Holladay et al. |
| 2010/0332565 A1 | 12/2010 | Al-Shaykh et al. |
| 2011/0004330 A1 | 1/2011 | Rothkopf et al. |
| 2011/0014376 A1 | 1/2011 | Sisk et al. |
| 2011/0047574 A1 | 2/2011 | Tecot et al. |
| 2011/0054641 A1 | 3/2011 | Hur et al. |
| 2011/0055901 A1 | 3/2011 | Karaoguz et al. |
| 2011/0060994 A1 | 3/2011 | Maxwell et al. |
| 2011/0060998 A1 | 3/2011 | Schwartz et al. |
| 2011/0063317 A1 | 3/2011 | Gharaat et al. |
| 2011/0066943 A1 | 3/2011 | Brillon et al. |
| 2011/0074794 A1 | 3/2011 | Felt et al. |
| 2011/0107213 A1 | 5/2011 | Johnson et al. |
| 2011/0125809 A1 | 5/2011 | Woods et al. |
| 2011/0126104 A1 | 5/2011 | Woods et al. |
| 2011/0131272 A1 | 6/2011 | Littlejohn et al. |
| 2011/0131518 A1 | 6/2011 | Ohashi |
| 2011/0131520 A1 | 6/2011 | Al-Shaykh et al. |
| 2011/0143769 A1 | 6/2011 | Jones et al. |
| 2011/0161815 A1 | 6/2011 | Iwahara |
| 2011/0173666 A1 | 7/2011 | Yu et al. |
| 2011/0179455 A1 | 7/2011 | Thompson |
| 2011/0218656 A1 | 9/2011 | Bishop et al. |
| 2011/0225496 A1 | 9/2011 | Jeffe et al. |
| 2011/0231660 A1 | 9/2011 | Kanungo |
| 2011/0247035 A1 | 10/2011 | Adimatyam et al. |
| 2011/0252118 A1 | 10/2011 | Pantos et al. |
| 2011/0264732 A1 | 10/2011 | Robbin et al. |
| 2011/0265003 A1 | 10/2011 | Schubert et al. |
| 2011/0265157 A1 | 10/2011 | Ryder |
| 2011/0270742 A1 | 11/2011 | Zmuda |
| 2011/0289135 A1 | 11/2011 | Soldan et al. |
| 2011/0295393 A1 | 12/2011 | Lindahl |
| 2011/0295974 A1 | 12/2011 | Kashef et al. |
| 2011/0314388 A1 | 12/2011 | Wheatley |
| 2012/0014233 A1 | 1/2012 | Lee et al. |
| 2012/0029672 A1 | 2/2012 | Hamilton et al. |
| 2012/0029694 A1 | 2/2012 | Muller |
| 2012/0038541 A1 | 2/2012 | Song et al. |
| 2012/0040720 A1 | 2/2012 | Zhang et al. |
| 2012/0050012 A1 | 3/2012 | Alsina et al. |
| 2012/0054808 A1 | 3/2012 | Nijim et al. |
| 2012/0057853 A1 | 3/2012 | Huber et al. |
| 2012/0079126 A1 | 3/2012 | Evans et al. |
| 2012/0088477 A1 | 4/2012 | Cassidy |
| 2012/0089910 A1 | 4/2012 | Cassidy |
| 2012/0096125 A1 | 4/2012 | Kallai et al. |
| 2012/0110126 A1 | 5/2012 | Sparks |
| 2012/0113964 A1 | 5/2012 | Petersen et al. |
| 2012/0116883 A1 | 5/2012 | Asam et al. |
| 2012/0117026 A1 | 5/2012 | Cassidy |
| 2012/0117193 A1 | 5/2012 | Phillips et al. |
| 2012/0117586 A1 | 5/2012 | Mccoy et al. |
| 2012/0131125 A1 | 5/2012 | Seidel et al. |
| 2012/0147825 A1 | 6/2012 | Hassan et al. |
| 2012/0159372 A1 | 6/2012 | Stallings et al. |
| 2012/0174039 A1 | 7/2012 | Rhoads et al. |
| 2012/0174204 A1 | 7/2012 | Sturm et al. |
| 2012/0185770 A1 | 7/2012 | Hwang et al. |
| 2012/0190398 A1 | 7/2012 | Leukkunen |
| 2012/0192071 A1 | 7/2012 | Millington |
| 2012/0195433 A1* | 8/2012 | Eppolito ................. H04S 3/008 |
| | | 381/1 |
| 2012/0202485 A1 | 8/2012 | Mirbaha et al. |
| 2012/0210205 A1 | 8/2012 | Sherwood et al. |
| 2012/0210225 A1 | 8/2012 | McCoy et al. |
| 2012/0210378 A1* | 8/2012 | McCoy ............... H04N 21/858 |
| | | 725/109 |
| 2012/0227076 A1 | 9/2012 | McCoy et al. |
| 2012/0233067 A1 | 9/2012 | Matthew et al. |
| 2012/0233639 A1 | 9/2012 | Zott et al. |
| 2012/0272062 A1 | 10/2012 | Lee et al. |
| 2012/0284423 A1 | 11/2012 | Weel et al. |
| 2012/0290653 A1 | 11/2012 | Sharkey |
| 2012/0296947 A1 | 11/2012 | Goto |
| 2012/0304233 A1 | 11/2012 | Roberts et al. |
| 2012/0311094 A1 | 12/2012 | Biderman et al. |
| 2012/0311280 A1 | 12/2012 | Schmidt et al. |
| 2012/0311618 A1 | 12/2012 | Blaxland et al. |
| 2013/0014015 A1 | 1/2013 | Lambourne |
| 2013/0024018 A1 | 1/2013 | Chang et al. |
| 2013/0024880 A1 | 1/2013 | Moloney-Egnatios et al. |
| 2013/0028263 A1 | 1/2013 | Rajapakse et al. |
| 2013/0047084 A1 | 2/2013 | Sanders et al. |
| 2013/0054742 A1 | 2/2013 | Tsuji et al. |
| 2013/0067303 A1 | 3/2013 | Kantor et al. |
| 2013/0076651 A1 | 3/2013 | Reimann et al. |
| 2013/0080955 A1 | 3/2013 | Reimann et al. |
| 2013/0086003 A1 | 4/2013 | Alsina et al. |
| 2013/0091558 A1 | 4/2013 | Kim et al. |
| 2013/0103873 A1 | 4/2013 | Reilly et al. |
| 2013/0111529 A1 | 5/2013 | Yao et al. |
| 2013/0117299 A1 | 5/2013 | Kraatz et al. |
| 2013/0138446 A1* | 5/2013 | Hellmuth ................. G10L 19/04 |
| | | 704/500 |
| 2013/0151728 A1 | 6/2013 | Currier et al. |
| 2013/0157566 A1 | 6/2013 | Oguchi et al. |
| 2013/0159858 A1 | 6/2013 | Joffray et al. |
| 2013/0165164 A1 | 6/2013 | Rowe et al. |
| 2013/0167029 A1 | 6/2013 | Friesen et al. |
| 2013/0198264 A1 | 8/2013 | Hellman et al. |
| 2013/0254663 A1 | 9/2013 | Bates et al. |
| 2013/0290419 A1 | 10/2013 | Spencer et al. |
| 2013/0300546 A1 | 11/2013 | Kim et al. |
| 2013/0326041 A1 | 12/2013 | Bellet et al. |
| 2013/0347117 A1 | 12/2013 | Parks et al. |
| 2014/0006483 A1 | 1/2014 | Garmark et al. |
| 2014/0006947 A1 | 1/2014 | Garmark et al. |
| 2014/0016786 A1* | 1/2014 | Sen ..................... H04S 3/008 |
| | | 381/23 |
| 2014/0052770 A1 | 2/2014 | Gran et al. |
| 2014/0053182 A1 | 2/2014 | Jääger et al. |
| 2014/0074959 A1 | 3/2014 | Alsina et al. |
| 2014/0075308 A1 | 3/2014 | Sanders et al. |
| 2014/0075314 A1 | 3/2014 | Bachman et al. |
| 2014/0080479 A1 | 3/2014 | Vangala et al. |
| 2014/0096166 A1 | 4/2014 | Gordon et al. |
| 2014/0108929 A1 | 4/2014 | Garmark et al. |
| 2014/0115462 A1 | 4/2014 | Reznor et al. |
| 2014/0122589 A1 | 5/2014 | Fyke et al. |
| 2014/0122737 A1 | 5/2014 | Silberstein et al. |
| 2014/0123005 A1 | 5/2014 | Forstall et al. |
| 2014/0140530 A1 | 5/2014 | Gomes-Casseres et al. |
| 2014/0149544 A1 | 5/2014 | Le Nerriec et al. |
| 2014/0169569 A1 | 6/2014 | Toivanen et al. |
| 2014/0195587 A1 | 7/2014 | Sukoff et al. |
| 2014/0195925 A1 | 7/2014 | Wikander et al. |
| 2014/0201634 A1 | 7/2014 | Hill et al. |
| 2014/0215009 A1 | 7/2014 | Zhang et al. |
| 2014/0229959 A1 | 8/2014 | Beckhardt et al. |
| 2014/0277651 A1 | 9/2014 | Gomes-Casseres et al. |
| 2014/0282755 A1 | 9/2014 | Alsina et al. |
| 2014/0282882 A1 | 9/2014 | Tsui et al. |
| 2014/0347565 A1 | 11/2014 | Fullam et al. |
| 2014/0378056 A1 | 12/2014 | Liu et al. |
| 2015/0026613 A1 | 1/2015 | Kwon et al. |
| 2015/0074527 A1 | 3/2015 | Sevigny et al. |
| 2015/0074528 A1 | 3/2015 | Sakalowsky et al. |
| 2015/0142453 A1* | 5/2015 | Oomen ................. G10L 19/265 |
| | | 704/500 |

(56) References Cited

U.S. PATENT DOCUMENTS

| | | |
|---|---|---|
| 2015/0256954 A1 | 9/2015 | Carlsson et al. |
| 2015/0286360 A1 | 10/2015 | Wachter |
| 2015/0296268 A1 | 10/2015 | Lee et al. |
| 2015/0304476 A1 | 10/2015 | Katada et al. |
| 2016/0048485 A1 | 2/2016 | Sherwood et al. |
| 2016/0066010 A1 | 3/2016 | Drope |
| 2016/0088415 A1* | 3/2016 | Krueger ............... G10L 19/008 381/23 |
| 2016/0104493 A1* | 4/2016 | Kim ...................... G10L 19/167 381/22 |
| 2016/0104494 A1* | 4/2016 | Kim ...................... G10L 19/167 381/23 |
| 2016/0247508 A1* | 8/2016 | Dick ........................ H04S 3/008 |
| 2016/0292775 A1 | 10/2016 | Blass |
| 2016/0329056 A1* | 11/2016 | Vasilache ............ G10L 19/0204 |
| 2017/0013066 A1 | 1/2017 | Toprani et al. |
| 2017/0068507 A1 | 3/2017 | Kim et al. |
| 2017/0133007 A1 | 5/2017 | Drewes |
| 2017/0147600 A1 | 5/2017 | Brand |
| 2017/0251214 A1 | 8/2017 | Chan et al. |
| 2017/0255698 A1 | 9/2017 | Zhang et al. |
| 2017/0262253 A1 | 9/2017 | Silva et al. |
| 2017/0311008 A1 | 10/2017 | Petersen |
| 2017/0332185 A1* | 11/2017 | Villemoes ............ G10L 19/008 |
| 2017/0339505 A1* | 11/2017 | Purnhagen .............. H04S 3/008 |
| 2018/0088901 A1 | 3/2018 | Drinkwater et al. |
| 2018/0121158 A1 | 5/2018 | Hinokio et al. |
| 2018/0332341 A1 | 11/2018 | Moloney-Egnatios et al. |
| 2019/0005131 A1 | 1/2019 | Kumar et al. |
| 2019/0228034 A1 | 7/2019 | Kumar et al. |
| 2020/0026489 A1 | 1/2020 | Bromand et al. |
| 2020/0265851 A1* | 8/2020 | Fuchs ................... G10L 19/032 |
| 2020/0294512 A1* | 9/2020 | Ehara ...................... G10L 19/20 |
| 2022/0075813 A1 | 3/2022 | Rothkopf et al. |

FOREIGN PATENT DOCUMENTS

| | | |
|---|---|---|
| CA | 2824732 A1 | 3/2011 |
| CA | 2832542 A1 | 10/2012 |
| CA | 2947275 A1 | 10/2012 |
| CN | 1363184 A | 8/2002 |
| CN | 1684423 A | 10/2005 |
| CN | 1906604 A | 1/2007 |
| CN | 101009127 A | 8/2007 |
| CN | 101212823 A | 7/2008 |
| CN | 101222493 A | 7/2008 |
| CN | 101268473 A | 9/2008 |
| CN | 101340541 A | 1/2009 |
| CN | 101410773 A | 4/2009 |
| CN | 101595711 A | 12/2009 |
| CN | 101627602 A | 1/2010 |
| CN | 101636727 A | 1/2010 |
| CN | 101689944 A | 3/2010 |
| CN | 102098538 A | 6/2011 |
| CN | 102171687 A | 8/2011 |
| CN | 102281294 A | 12/2011 |
| CN | 102740146 A | 10/2012 |
| CN | 102782669 A | 11/2012 |
| CN | 103093789 A | 5/2013 |
| EP | 1389853 A1 | 2/2004 |
| EP | 1427218 A2 | 6/2004 |
| EP | 1548741 A1 | 6/2005 |
| EP | 1809030 A2 | 7/2007 |
| EP | 2023578 A1 | 2/2009 |
| EP | 2296365 A1 | 3/2011 |
| EP | 2456199 A2 | 5/2012 |
| EP | 2986034 B1 | 5/2017 |
| EP | 3146731 B1 | 12/2017 |
| EP | 2751955 B1 | 11/2019 |
| JP | 2006054521 | 2/2006 |
| JP | 2007060123 A | 3/2007 |
| JP | 2007512718 | 5/2007 |
| JP | 2007199220 A | 8/2007 |
| JP | 2008027537 A | 2/2008 |
| JP | 2009044410 | 2/2009 |
| JP | 2010501907 A | 1/2010 |
| JP | 2010067097 A | 3/2010 |
| JP | 2010510696 | 4/2010 |
| JP | 2010530547 A | 9/2010 |
| JP | 4752793 B2 | 8/2011 |
| JP | 2012507052 | 3/2012 |
| JP | 4929520 B2 | 5/2012 |
| JP | 2012248199 A | 12/2012 |
| JP | 2013101631 A | 5/2013 |
| KR | 20090017795 | 2/2009 |
| KR | 20090017795 A | 2/2009 |
| KR | 20130005890 A | 1/2013 |
| TW | 200943962 A | 10/2009 |
| WO | 9709756 A2 | 3/1997 |
| WO | 9927681 A2 | 6/1999 |
| WO | 200147248 | 6/2001 |
| WO | 200153994 | 7/2001 |
| WO | 2003093950 A2 | 11/2003 |
| WO | 2005013047 A2 | 2/2005 |
| WO | 2006068908 A2 | 6/2006 |
| WO | 2007081048 A1 | 7/2007 |
| WO | 2006101635 A3 | 12/2007 |
| WO | 2008047184 A1 | 4/2008 |
| WO | 2008112586 A1 | 9/2008 |
| WO | 2008120111 A1 | 10/2008 |
| WO | 2008133675 A1 | 11/2008 |
| WO | 2009086597 A1 | 7/2009 |
| WO | 2009086599 A1 | 7/2009 |
| WO | 2010053803 A1 | 5/2010 |
| WO | 2010065848 A2 | 6/2010 |
| WO | 2010107490 A1 | 9/2010 |
| WO | 2011020065 A1 | 2/2011 |
| WO | 2011049497 A1 | 4/2011 |
| WO | 2011078879 A1 | 6/2011 |
| WO | 2013049346 A1 | 4/2013 |
| WO | 2013055661 A1 | 4/2013 |
| WO | 2013101727 | 7/2013 |
| WO | 2014149533 A2 | 9/2014 |
| WO | 2014172462 A1 | 10/2014 |

OTHER PUBLICATIONS

Notice of Allowance mailed on Nov. 5, 2020, issued in connection with U.S. Appl. No. 16/372,054, filed Apr. 1, 2019, 22 pages.

Notice of Allowance mailed on Jan. 7, 2019, issued in connection with U.S. Appl. No. 16/107,092, filed Aug. 21, 2018, 13 pages.

Notice of Allowance mailed on Jul. 7, 2023, issued in connection with U.S. Appl. No. 17/661,357, filed Apr. 29, 2022, 10 pages.

Notice of Allowance mailed on Apr. 9, 2020, issued in connection with U.S. Appl. No. 16/389,906, filed Apr. 19, 2019, 7 pages.

Notice of Allowance mailed on Aug. 9, 2017, issued in connection with U.S. Appl. No. 15/131,840, filed Apr. 18, 2016, 7 pages.

Notification of Reopening of Prosecution Due to Consideration of an Information Disclosure Statement Filed After Mailing of a Notice of Allowance mailed on Jan. 20, 2017, issued in connection with U.S. Appl. No. 14/520,566, filed Oct. 22, 2014, 2 pages.

"Sonos Multi-Room Music System User Guide," Version 090401, Sonos, Inc. Apr. 1, 2009, 256 pages.

"Sonos Wireless Dock Product Guide," Version 100101, Sonos, Inc. Oct. 10, 2001, 196 pages.

"SonosTM Digital Music System User Guide", Version: 070101, Sonos, Inc., Jan. 2007, 179 pages.

Opponent's Reply to the brief of the patent proprietor regarding EP19178151.7/EP3554005, Sonos, Inc. v. Google Germany GmbH filed on Aug. 4, 2022, 79 pages.

Opponent's Reply to the preliminary opinion of the Opposition Division regarding EP19178151.7/EP3554005, Sonos, Inc. v. Google Germany GmbH filed on Jul. 5, 2022, 67 pages.

OSXDaily. Stream Music from iPhone iPod to a Computer or Apple TV with Airplay. Mar. 3, 2013. 6 pages [produced by Google in Hamburg Regional Court, Case No. 327 O 378/20 on Jan. 5, 2021].

Palm, Inc., "Handbook for the Palm VII Handheld," May 2000, 311 pages.

Panasonic. Toughbook 29. Specification Sheet, Jul. 2006, 2 pages. [produced by Google in WDTX Case No. 6:20-cv-00881 on Mar. 5, 2021].

(56)　　　　　References Cited

OTHER PUBLICATIONS

Pre-Interview First Office Action mailed on Dec. 22, 2015, issued in connection with U.S. Appl. No. 14/520,578, filed Oct. 22, 2014, 9 pages.
Presentations at WinHEC 2000, May 2000, 138 pages.
Principled Technologies. A performance comparison of current and previous generation Dell Latitude notebook systems. Oct. 2009, 51 pages. [produced by Google in WDTX Case No. 6:20-cv-00881 on Mar. 5, 2021].
PRISMIQ, Inc., "PRISMIQ Media Player User Guide," 2003, 44 pages.
Reisinger, Don, "Make Your House Rock from Any Room," PCWorld: TechHive, Jul. 19, 2011, 5 pages. [produced by Google in WDTX Case No. 6:20-cv-00881 on Mar. 5, 21].
Ritchie et al., "UPnP AV Architecture:2 For UPnP Version 1.0", 2010, XP055032201, retrieved from the internet: URL: http://upnp.org/specs/av/UPnP-av_AVArchitecture-v2.pdf, 35 pages.
Salvator, Dave. Intel Pushes Plug and Play Into Homes. Extremetech.com. Sep. 10, 2002, 10 pages. [produced by Google in WDTX Case No. 6:20-cv-00881 on Mar. 5, 2021].
Screen parameters—The VideoLAN Forums. Last post Jan. 10, 2009, 3 pages. [produced by Google in WDTX Case No. 6:20-cv-00881 on Mar. 5, 2021].
Sinofsky, Steven. Media Streaming with Windows 7 - Engineering Windows 7, May 12, 2009, 13 pages. [produced by Google in WDTX Case No. 6:20-cv-00881 on Mar. 5, 21].
Sonos Digital Music System User Guide, Jun. 2007, 193 pages. [produced by Google in WDTX Case No. 6:20-cv-00881 on Mar. 5, 2021].
Sonos's Further Response to Summons of the Opponent before the European Patent Office filed on Sep. 1, 2022 in connection with European Application No. 19178151.7, 86 pages.
Sonos's Further Written Submissions and Evidence before the European Patent Office filed on Sep. 1, 2022 in connection with European Application No. 19178151.7, 86 pages.
Sonos, Inc. v. Google Germany GmbH, Google's Submission Case No. 327 O 378/20, Feb. 1, 2021, 20 pages.
Sonos, Inc. v. Google Germany GmbH, Google's Submission Case No. 327 O 378/20, Jan. 27, 2021, 6 pages.
Sonos, Inc. v. Google Germany GmbH, Google's Submission for alleged patent infringement of EP3554005 Case No. 327 O 378/20. Feb. 2, 2021, 10 pages.
Sonos, Inc. v. Google Germany GmbH, Grounds for Appeal Case No. 327 O 378/20. Apr. 26, 2021, 31 pages.
Sonos, Inc. v. Google Germany GmbH, Judgment for alleged patent infringement of EP3554005 Case No. 327 O 378/20. Feb. 25, 2021, 22 pages.
Sonos, Inc. v. Google Germany GmbH, Oral Hearing Transcript for alleged patent infringement of EP3554005 Case No. 327 O 378/20. Jan. 28, 2021, 8 pages.
Sonos, Inc. v. Google Germany GmbH. Reply. Case No. 327 O 378/20 dated Jan. 5, 2021, 53 pages.
Sonos, Inc. v. Google Germany GmbH, Sonos's Submission Case No. 327 O 378/20 Feb. 2, 2021, 17 pages.
Sonos, Inc. v. Google Germany GmbH, Sonos's Submission Case No. 327 O 378/20, Jan. 20, 2021, 40 pages.
Sonos, Inc. v. Google Germany GmbH, Sonos's Submission Case No. 327 O 378/20, Jan. 27, 2021, 33 pages.
Sonos, Inc v. Google Ireland Limited, Google's Exhibit A3 in Reply to Preliminary Injunction Submission for alleged patent infringement EP3554005 Case No. 327 O 36/21. Feb. 22, 2021, 414 pages.
Sonos, Inc v. Google Ireland Limited, Google's Exhibit D3a in Reply to Preliminary Injunction Submission for alleged patent infringement EP3554005 Case No. 327 O 36/21. Feb. 22, 2021, 7 pages.
Sonos, Inc v. Google Ireland Limited, Google's Exhibit D3b in Reply to Preliminary Injunction Submission for alleged patent infringement EP3554005 Case No. 327 O 36/21. Feb. 22, 2021, 6 pages.

Sonos, Inc v. Google Ireland Limited, Google's Exhibit D3c in Reply to Preliminary Injunction Submission for alleged patent infringement EP3554005 Case No. 327 O 36/21. Feb. 22, 2021, 4 pages.
Advisory Action mailed on Dec. 2, 2015, issued in connection with U.S. Appl. No. 13/904,936, filed May 29, 2013, 4 pages.
Advisory Action mailed on Dec. 5, 2016, issued in connection with U.S. Appl. No. 13/904,923, filed May 29, 2013, 5 pages.
Advisory Action mailed on May 1, 2019, issued in connection with U.S. Appl. No. 13/904,909, filed May 29, 2013, 3 pages.
Advisory Action mailed on Jun. 13, 2022, issued in connection with U.S. Appl. No. 16/565,105, filed Sep. 9, 2019, 4 pages.
Advisory Action mailed on Mar. 13, 2018, issued in connection with U.S. Appl. No. 13/904,909, filed May 29, 2013, 3 pages.
Advisory Action mailed on Apr. 14, 2017, issued in connection with U.S. Appl. No. 14/628,952, filed Feb. 23, 2015, 3 pages.
Advisory Action mailed on Mar. 15, 2017, issued in connection with U.S. Appl. No. 13/533,785, filed Jun. 26, 2012, 6 pages.
Advisory Action mailed on Dec. 16, 2015, issued in connection with U.S. Appl. No. 13/904,949, filed May 29, 2013, 11 pages.
Advisory Action mailed on Jun. 16, 2016, issued in connection with U.S. Appl. No. 13/904,896, filed May 29, 2013, 5 pages.
Advisory Action mailed on Oct. 16, 2013, issued in connection with U.S. Appl. No. 13/341,237, filed Dec. 30, 2011, 3 pages.
Advisory Action mailed on Sep. 17, 2015, issued in connection with U.S. Appl. No. 14/520,566, filed Oct. 22, 2014, 4 pages.
Advisory Action mailed on Jun. 23, 2021, issued in connection with U.S. Appl. No. 16/565,105, filed Sep. 9, 2019, 4 pages.
Advisory Action mailed on Apr. 29, 2016, issued in connection with U.S. Appl. No. 13/864,075, filed Apr. 16, 2013, 3 pages.
Advisory Action mailed on Oct. 29, 2015, issued in connection with U.S. Appl. No. 13/864,081, filed Apr. 16, 2013, 3 pages.
Advisory Action mailed on Aug. 9, 2019, issued in connection with U.S. Appl. No. 15/131,018, filed Apr. 17, 2016, 3 pages.
AirPlay vs Sonos: choose the best audio streaming for your studio. Creative Blog. (available athttps://web.archive.org/web/20121207090525/ http://www.creativebloq.com/hardware/airplay-vs-sonos-12121441), published Dec. 5, 2012, 15 pages. [produced by Google in WDTX Case No. 6:20-cv-00881 on Mar. 5, 2021].
Anonymous, "Shazam (service)—Wikipedia, the free encyclopedia", 2011, 5 pages, XP055197950.
Anonymous, "Sonos Controller for Mac or PC Product Guide", Retrieved from the Internet, XP055254086, 2013, 108 pages.
Apple Launches iPad—Apple. Press Release (available at https://www.apple.com/newsroom/2010/01/27Apple-Launches-iPad/), published Jan. 27, 2010, 4 pages. [produced by Google in WDTX Case No. 6:20-cv-00881 on Mar. 5, 21].
Apple. Screenshots of Apple AirPlay. 7 pages [produced by Google in Hamburg Regional Court, Case No. 327 O 378/20 on Jan. 5, 2021].
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Australian Intellectual Property Office, Patent ExaminationReport No. 1 mailed on Jan. 16, 2015, issued in connection with Australian PatentApplication No. 2012362573, 3 pages.
Australian Patent Office, Australian Examination Report Action mailed on Oct. 14, 2021, issued in connection with Australian Application No. 2020239784, 3 pages.
Australian Patent Office, Australian Examination Report Action mailed on May 24, 2022, issued in connection with Australian Application No. 2020239784.0, 3 pages.
Australian Patent Office, Australian Examination Report Action mailed on Jul. 3, 2019, issued in connection with Australian Application No. 2018203185, 3 pages.
Australian Patent Office, Australian Examination Report Action mailed on Jan. 31, 2020, issued in connection with Australian Application No. 2018203185, 4 pages.
Australian Patent Office, Australian Office Action mailed on Jun. 10, 2020, issued in connection with Australian Application No. 2018203185, 3 pages.

(56)     References Cited

OTHER PUBLICATIONS

Australian Patent Office, Examination Report mailed on Mar. 22, 2017, issued in connection with Australian Application No. 2016202175, 3 pages.

Barix Download Exstreamer Software. Accessed via WayBack Machine, Apr. 6, 2003. http://www.barix.com/estreamer/software. download.html. 2 pages.

Barix. Exstreamer Datasheet. Accessed via WayBack Machine, Apr. 2, 2003. http://www.barix.com/exstreamer/, 1 page.

Bassoli et al. TunA: Local music sharing with handheld Wi-Fi devices. In Proc of 5th Wireless World Conference 2004, 23 pages. [produced by Google in WDTX Case No. 6:20-cv-00881 on Mar. 5, 21].

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Breen, Christopher. Sonos Play:3. Capsule Review. Macworld, published Jul. 25, 2011, 8 pages. [produced by Google in WDTX Case No. 6:20-cv-00881 on Mar. 5, 2021].

Broida, Rick. Turn an Extra PC Into a Second Monitor. CBS News. Nov. 19, 2009, 6 pages. [produced by Google in WDTX Case No. 6:20-cv-00881 on Mar. 5, 2021].

Cable et al., "The complete guide to AirPlay", http:// www.techradar. com/:, May 1, 2011, 7 pages.

Canadian Patent Office, Canadian Examination Report mailed on Apr. 13, 2022, issued in connection with Canadian Application No. 3077786, 9 pages.

Canadian Patent Office, Canadian Examination Report mailed on May 13, 2024, issued in connection with Canadian Application No. 3138602, 4 pages.

Canadian Patent Office, Canadian Examination Report mailed on Oct. 23, 2023, issued in connection with Canadian Application No. 3138602, 3 pages.

Canadian Patent Office, Canadian Examination Report mailed on Jun. 7, 2021, issued in connection with Canadian Application No. 3077786, 4 pages.

Canadian Patent Office, Canadian Office Action mailed on Nov. 3, 2016, issued in connection with Canadian Application No. 2,861,790, 4 pages.

Canadian Patent Office, Canadian Office Action mailed on Dec. 10, 2019, issued in connection with Canadian Application No. 2861790, 5 pages.

Canadian Patent Office, Canadian Office Action mailed on Nov. 12, 2015, issued in connection with Canadian Application No. 2,861,790, 3 pages.

Canadian Patent Office, Canadian Office Action mailed on Nov. 22, 2017, issued in connection with CA Application No. 2861790, 4 pages.

Canadian Patent Office, Office Action mailed on Sep. 13, 2018, issued in connection with Canadian Application No. 2861790, 4 pages.

Carnoy et al. Apple AirPlay: 10 things you need to know. Wondering what Apple's AirPlay wireless streaming feature is all about? Here's a little primer to get you started. Apr. 4, 2011, 10 pages. [produced by Google in WDTX Case No. 6:20-cv-00881 on Mar. 5, 2021].

Chandra, Surendar. Lean back with YouTube and Android. FXPAL, Nov. 11, 2010, 2 pages. [produced by Google in WDTX Case No. 6:20-cv-00881 on Mar. 5, 2021].

*Google LLC* v. *Sonos, Inc.*, Sonos Inc.'s Opposition to Google's Motions for Summary Judgment and Non-Confidential Exhibits. Northern District of California Case No. 3:20-cv-06754-WHA, Feb. 21, 2023, 103 pages.

*Google LLC* v. *Sonos, Inc.*, Sonos, Inc.'s Reply Claim Construction Brief, Northern District of California Case No. 3:20-cv-06754, dated Apr. 11, 2022, 20 pages.

*Google LLC* v. *Sonos, Inc.*, Sonos Inc.'s Response to Request for Information. Northern District of California Case No. 3:20-cv-06754-WHA, Mar. 29, 2023, 7 pages.

*Google LLC* v. *Sonos, Inc.*, Sonos, Inc's Third Supplemental Responses and Objections to Google's First Set of Interrogatories [1-20], Northern District of California Case No. 3:20-cv-06754, dated Mar. 21, 2022, 340 pages.

*Google LLC* v. *Sonos, Inc.* Sonos's Second Supplemental Responses and Objections to Google's First Set of Interrogatories and Attachment A, Case No. 3:20-cv-06754, Feb. 4, 2022, 590 pages.

*Google LLC* v. *Sonos, Inc.* Sonos's Opposition to Google's Motion for Supplemental Claim Construction Briefing. Northern District of California Case No. C 20-06754-WHA, Oct. 25, 2022, 60 pages.

*Google LLC* v. *Sonos, Inc.*, Judgment. Final Written Decision Determining All Challenged Claims Unpatentable Inter Partes Review of U.S. Pat. No. 9,967,615, Case No. IPR2021-01563, dated Apr. 10, 2023, 78 pgs.

*Google LLC* v. *Sonos, Inc.*, Petitioner's Reply of U.S. Pat. No. 9,967,615, Case No. IPR2021-01563, dated Sep. 29, 2022, 35 pages.

*Google LLC* v. *Sonos, Inc.*, Petitioner's Reply to Patent Owner's Preliminary Response for Inter Partes Review of U.S. Pat. No. 9,967,615, Case No. IPR2021-01563, dated Feb. 14, 2022, 9 pgs.

*Google LLC* v. *Sonos, Inc.*, Petitioner's Updated Exhibit List and Exhibits 1025-1030 for IPR of U.S. Pat. No. 9,967,615, Case No. IPR2021-01563, dated Feb. 14, 2022, 170 pgs.

Google Music beta demo from Google I/O 2011 Video. YouTube. May 10, 2011, https://www.youtube.com/watch?v=9ZlgcuG3sZc, 3 pages. [produced by Google in WDTX Case No. 6:20-cv-00881 on Mar. 5, 2021].

Google's Reply to Sonos's Response dated Dec. 2, 2021 before the European Patent Office filed on Feb. 8, 2022 in connection with European Application No. 19178151.7, 21 pages.

Google's Supplementary Statement before the European Patent Office filed on Apr. 15, 2021 in connection with the Opposition to European Application No. 19178151.7, 19 pages.

Google's Third Set of Arguments and Supplementary Statement before the European Patent Office filed on Aug. 2, 2021 in connection with opposition of European Application No. 19178151.7, 22 pages.

*Google LLC* v. *Sonos, Inc.* Plaintiffs' Invalidity Claim Charts for U.S. Pat. No. 10,779,033, Exhibits 4-13, dated Dec. 6, 2021, 444 pages.

*Google LLC* v. *Sonos, Inc.* Plaintiffs' Invalidity Claim Charts for U.S. Pat. No. 9,967,615, Exhibits 4-13, dated Dec. 6, 2021, 574 pages.

Gralla, Preston. MaxiVista Turns Other PCs Into Multiple Monitors. PCWorld. Dec. 17, 2009, 2 pages. [produced by Google in WDTX Case No. 6:20-cv-00881 on Mar. 5, 2021].

Home Networking with Universal Plug and Play, IEEE Communications Magazine, vol. 39 No. 12 (Dec. 2001) (D+M_0402025-40) (16 pages).

How to control Google TV or YouTube Leanback with YouTube Remote. YouTube. Nov. 14, 2010, https://www. youtube.com/watch?v=EGdsOslqG2s, 3 pages. [produced by Google in WDTX Case No. 6:20-cv-00881 on Mar. 5, 2021].

IFA 2010: Spotify for Sonos multi-room music systems demoed. YouTube. Sep. 4, 2010, https://www.youtube.com/watch?v=3UcmwoCRnbw, 3 pages. [produced by Google in WDTX Case No. 6:20-cv-00881 on Mar. 5, 2021].

iHome Air Series. iW1 User Manual: AirPlay wireless speaker system with rechargeable battery, Copyright 2011, 20 pages. [produced by Google in WDTX Case No. 6:20-cv-00881 on Mar. 5, 2021].

iHome iW1 Airplay Series Set-up Guide. YouTube. Nov. 9, 2011, https://www.youtube.com/watch?v=OfSsWnRnkFw, 3 pages. [produced by Google in WDTX Case No. 6:20-cv-00881 on Mar. 5, 2021].

iHome iW1 AirPlay Wireless Speaker Overview | Crutchfield Video. YouTube. Sep. 14, 2011, https://www. youtube.com/watch?v=aL273y_rq0M, 3 pages. [produced by Google in WDTX Case No. 6:20-cv-00881 on Mar. 5, 2021].

iHome iW1 Quick Start Guide (https://cdn.ihomeaudio.com/media/product/files/iW1_Quick_Start_Guide_1.pdf), 2 pages. [produced by Google in WDTX Case No. 6:20-cv-00881 on Mar. 5, 2021].

(56) References Cited

OTHER PUBLICATIONS

International Bureau, International Preliminary Report on Patentability, mailed Jul. 10, 2014, issued in connection with International Application No. PCT/US2012/071212, filed Dec. 21, 2012, 8 pages.
International Bureau, International Preliminary Report on Patentability mailed Feb. 8, 2018, issued in connection with International Application No. PCT/US2016/043840, filed on Jul. 25, 2016, 10 pages.
International Bureau, International Preliminary Report on Patentability, mailed on Jan. 8, 2015, issued in connection with International Application No. PCT/US2013/046383, mailed on Jun. 18, 2013, 9 pages.
International Bureau, International Preliminary Report on Patentability, mailed on Oct. 29, 2015, issued in connection with International Application No. PCT/US2014/034290, filed on Apr. 16, 2014, 7 pages.
International Bureau, International Preliminary Report on Patentibility, mailed on Oct. 29, 2015, issued in connection with International Application No. PCT/US2014/034292, filed on Apr. 16, 2014, 6 pages.
International Bureau, International Preliminary Report onPatentability, mailed on Oct. 29, 2015, issued in connection withInternational Application No. PCT/US2014/034372, filed on Apr. 16, 2014, 8pages.
International Bureau, International Search Report and Written Opinion mailed on Apr. 19, 2013, issued in connection with International Application No. PCT/US2012/071212, filed on Dec. 21, 2012, 9 pages.
International Searching Authority, International Report on Patentability mailed on Dec. 10, 2015, issued in connection with International Application No. PCT/US2014/039669, filed on May 28, 2014, 6 pages.
International Searching Authority, International Search Report mailed on Aug. 14, 2014, issued in connection with International Application No. PCT/US2014/034292, 3 pages.
International Searching Authority, International Search Report mailed on Aug. 21, 2014, issued in connection with International Application No. PCT/US2014/034290, filed on Apr. 16, 2014, 3 pages.
International Searching Authority, International Search Report mailed on Sep. 22, 2014, issued in connection with International Application No. PCT/US2014/039669, filed on May 28, 2014, 3 pages.
International Searching Authority, International Search Report mailed on Sep. 30, 2013, issued in connection with International Patent Application No. PCT/US2013/046383, filed on Jun. 18, 2013, 3 pages.
International Searching Authority, Written Opinion mailed on Aug. 14, 2014, issued in connection with International Application No. PCT/US2014/034292, filed on Apr. 16, 2014, 4 pages.
International Searching Authority, Written Opinion mailed on Aug. 20, 2014, issued in connection with International Application No. PCT/US2014/034372, filed on Apr. 16, 2014, 6 pages.
International Searching Authority, Written Opinion mailed on Sep. 22, 2014, issued in connection with International Application No. PCT/US2014/039669, filed on May 28, 2014, 5 pages.
International Searching Authority, Written Opinion mailed on Sep. 30, 2013, issued in connection with International Patent Application No. PCT/US2013/046383, filed on Jun. 18, 2013, 7 pages.
International Searching Authority, Written Opinion mailed on Aug. 21, 2014, issued in connection with International Application No. PCT/US2014/034290, filed on Apr. 16, 2014, 5 pages.
It's a Sphere! The Inside Story of Nexus Q, Google's Music Hardware Gamble https://www.wired.com/2012/06/google-nexus-q-revealed/, Jun. 2012, 19 pages. [produced by Google in WDTX Case No. 6:20-cv-00881 on Mar. 5, 2021].
Japanese Patent Office, Final Office Action mailed on Sep. 19, 2017, issued in connection with Japanese Patent Application No. 2016-509047, 1 page.
Japanese Patent Office, Japanese Office Action mailed on Jul. 12, 2016, issued in connection with Japanese Application No. 2014-550400, 10 pages.

Japanese Patent Office, Japanese Office Action mailed on Oct. 20, 2015, issued in connection with Japanese Application No. 2014-550400, 8 pages.
Japanese Patent Office, Non-Final Office Action mailed on Mar. 28, 2017, issued in connection with Japanese Patent Application No. 2016-516750, 5 pages.
European Patent Office, European Extended Search Report mailed on May 7, 2020, issued in connection with European Application No. 20159841.4, 16 pages.
European Patent Office, European Office Action mailed on Aug. 10, 2018, issued in connection with European Application No. 16160758.5, 4 pages.
European Patent Office, European Office Action mailed on Nov. 14, 2017, issued in connection with EP Application No. 14803651.0, 4 pages.
European Patent Office, European Office Action mailed on May 25, 2020, issued in connection with European Application No. 19178151.7, 4 pages.
European Patent Office, European Office Action mailed on Oct. 6, 2017, issued in connection with EP Application No. 14784965.7, 5 pages.
European Patent Office, European Preliminary Opinion on the Board of Appeal mailed on Dec. 16, 2021, issued in connection with European Application No. 12861517.6, 61 pages.
European Patent Office, European Search Report mailed on Oct. 13, 2022, issued in connection with European Application No. 22179278.1, 8 pages.
European Patent Office, European Search Report mailed on Jul. 22, 2019, issued in connection with European Application No. 19178151.7, 7 pages.
European Patent Office, European Search Report mailed on Jul. 27, 2022, issued in connection with European Application No. 22167991.3, 7 pages.
European Patent Office, European Search Report mailed on Oct. 30, 2015, issued in connection with European Patent Application No. 13810685.1, 8 pages.
European Patent Office, Exam Report mailed on Apr. 28, 2016, issued in connection with European Patent Application No. 12861517.6, 6 pages.
European Patent Office, Examination Report mailed on Sep. 2, 2016, issued in connection with European Patent Application No. 13810685.1, 6 pages.
European Patent Office, Extended European Search Report mailed Aug. 1, 2016, issued in connection with European patent application No. 16160758.5, 11 pages.
European Patent Office, Extended European Search Report mailed Jun. 7, 2016, issued in connection with European patent application No. 14803651.0, 10 pages.
European Patent Office, Extended European Search Report mailed Jun. 9, 2015, issued in connection with European patent application No. 12861517.6, 11 pages.
European Patent Office, Extended European Search Report mailed Sep. 9, 2016, issued in connection with European patent application No. 14785247.9, 10 pages.
European Patent Office, Extended European Search Report mailed Oct. 18, 2016, issued in connection with European patent application No. 14785806.2, 9 pages.
European Patent Office, Extended European Search Report mailed on Nov. 21, 2016, issued in connection with European Application No. 14784965.7-1870, 6 pages.
European Patent Office, Letter from Opponent and Translation mailed on Aug. 12, 2021, issued in connection with Opposition to European Application No. 19178151.7, 69 pages.
European Patent Office, Minutes of Oral Proceedings Before the Opposition Division on Dec. 20, 2022, issued in connection with European Application No. 19178151.7, 10 pages.
European Patent Office, Office Action mailed on Apr. 7, 2017, issued in connection with European Application No. 14803651.0, 4 pages.
European Patent Office, Office Action mailed on May 11, 2017, issued in connection with European Application No. 14785247.9, 9 pages.

(56) References Cited

OTHER PUBLICATIONS

European Patent Office, Summons to Attend Oral Proceedings mailed on Dec. 1, 2016, issued in connection with European Application No. 12861517.6-1905, 11 pages.

European Patent Office, Summons to Attend Oral Proceedings mailed on Jan. 3, 2017, issued in connection with European Patent Application No. 13810685.1, 7 pages.

European Patent Office, Summons to Attend Oral Proceedings mailed on Jul. 12, 2019, issued in connection with European Application No. 14785247.9, 12 pages.

European Patent Office, Summons to Attend Oral Proceedings mailed on Feb. 17, 2022, issued in connection with European Application No. 19178151.7, 21 pages.

European Patent Office, Summons to Attend Oral Proceedings mailed on Jun. 23, 2020, issued in connection with European Application No. 16160758.5, 10 pages.

Exstreamer—The Exstreamer Instruction Manual Version 1.5. Barix Think Further. Sourced from *Sonos, Inc.* v. *Lenbrook Industries Limited et al.*, Defendants' Answer to Plaintiff's Complaint—Exhibit E, filed Oct. 14, 2019, 21 pages.

Exstreamer—The Exstreamer Technical Description Version 1.5. Barix Think Further. Sourced from *Sonos, Inc.* v. *Lenbrook Industries Limited et al.*, Defendants' Answer to Plaintiff's Complaint—Exhibit D, filed Oct. 14, 2019, 36 pages.

Exstreamer. Network MP3 player for digital audio streaming in a consumer, home installation and commercialapplications. Barix Think Further. Sep. 2002, 2 pages.

Exstreamer. The Exstreamer Instruction Manual. Barix Think Further. Version 1.5 , Oct. 2002, 21 pages.

Exstreamer. The Exstreamer Technical Description: Version 1.5. Barix Think Further. Oct. 2002, 36 pages.

Final Office Action mailed on Jun. 2, 2016, issued in connection with U.S. Appl. No. 14/520,566, filed Oct. 22, 2014, 12 pages.

Final Office Action mailed on Aug. 6, 2013, issued in connection with U.S. Appl. No. 13/341,237, filed Dec. 30, 2011, 14 pages.

Final Office Action mailed on Dec. 7, 2015, issued in connection with U.S. Appl. No. 13/864,075, filed Apr. 16, 2013, 16 pages.

Final Office Action mailed on Feb. 7, 2017, issued in connection with U.S. Appl. No. 14/628,952, filed Feb. 23, 2015, 15 pages.

Final Office Action mailed on Jul. 8, 2015, issued in connection with U.S. Appl. No. 14/520,566, filed Oct. 22, 2014, 8 pages.

Final Office Action mailed on Mar. 10, 2016, issued in connection with U.S. Appl. No. 13/904,932, filed May 29, 2013, 16 pages.

Final Office Action mailed on Dec. 12, 2019, issued in connection with U.S. Appl. No. 13/904,909, filed May 29, 2013, 21 pages.

Final Office Action mailed on Jan. 13, 2023, issued in connection with U.S. Appl. No. 17/710,425, filed Mar. 31, 2022, 13 pages.

Final Office Action mailed on Sep. 13, 2019, issued in connection with U.S. Appl. No. 16/389,906, filed Apr. 19, 2019, 11 pages.

Final Office Action mailed on Apr. 14, 2014, issued in connection with U.S. Appl. No. 13/341,237, filed Dec. 30, 2011, 12 pages.

Final Office Action mailed on Dec. 15, 2017, issued in connection with U.S. Appl. No. 13/904,909, filed May 29, 2013, 12 pages.

Final Office Action mailed on Mar. 15, 2016, issued in connection with U.S. Appl. No. 13/533,785, filed Jun. 26, 2012, 18 pages.

Final Office Action mailed on May 15, 2017, issued in connection with U.S. Appl. No. 14/520,566, filed Oct. 22, 2014, 12 pages.

Final Office Action mailed on Mar. 18, 2019, issued in connection with U.S. Appl. No. 14/956,640, filed Dec. 2, 2015, 12 pages.

Final Office Action mailed on May 18, 2022, issued in connection with U.S. Appl. No. 17/145,268, filed Jan. 8, 2021, 15 pages.

Final Office Action mailed on May 19, 2016, issued in connection with U.S. Appl. No. 14/520,578, filed Oct. 22, 2014, 12 pages.

Final Office Action mailed on Apr. 20, 2018, issued in connection with U.S. Appl. No. 15/131,018, filed Apr. 17, 2016, 15 pages.

Notice of Allowance mailed on Mar. 9, 2017, issued in connection with U.S. Appl. No. 13/904,949, filed May 29, 2013, 13 pages.

Notice of Allowance mailed on Aug. 10, 2020, issued in connection with U.S. Appl. No. 16/389,906, filed Apr. 19, 2019, 7 pages.

Notice of Allowance mailed on Jul. 10, 2023, issued in connection with U.S. Appl. No. 17/686,237, filed Mar. 3, 2022, 8 pages.

Notice of Allowance mailed on Jul. 13, 2020, issued in connection with U.S. Appl. No. 16/550,148, filed Aug. 23, 2019, 7 pages.

Notice of Allowance mailed on Jun. 13, 2016, issued in connection with U.S. Appl. No. 13/864,075, filed Apr. 16, 2013, 11 pages.

Notice of Allowance mailed on Sep. 13, 2023, issued in connection with U.S. Appl. No. 17/536,922, filed Nov. 29, 2021, 7 pages.

Notice of Allowance mailed on Feb. 15, 2022, issued in connection with U.S. Appl. No. 16/372,054, filed Apr. 1, 2019, 11 pages.

Notice of Allowance mailed on Dec. 16, 2019, issued in connection with U.S. Appl. No. 15/872,500, filed Jan. 16, 2018, 7 pages.

Notice of Allowance mailed on May 16, 2018, issued in connection with U.S. Appl. No. 15/263,069, filed Sep. 12, 2016, 5 pages.

Notice of Allowance mailed on Nov. 16, 2018, issued in connection with U.S. Appl. No. 15/626,793, filed Jun. 19, 2017, 13 pages.

Notice of Allowance mailed on Aug. 17, 2017, issued in connection with U.S. Appl. No. 13/904,923, filed May 29, 2013, 23 pages.

Notice of Allowance mailed on Nov. 17, 2016, issued in connection with U.S. Appl. No. 13/904,949, filed May 29, 2013, 12 pages.

Notice of Allowance mailed on Oct. 17, 2017, issued in connection with U.S. Appl. No. 14/520,578, filed Oct. 22, 2014, 8 pages.

Notice of Allowance mailed on Nov. 18, 2020, issued in connection with U.S. Appl. No. 16/459,854, filed Jul. 2, 2019, 9 pages.

Notice of Allowance mailed on Mar. 20, 2024, issued in connection with U.S. Appl. No. 18/339,880, filed Jun. 22, 2023, 8 pages.

Notice of Allowance mailed on Sep. 20, 2016, issued in connection with U.S. Appl. No. 13/904,949, filed May 29, 2013, 12 pages.

Notice of Allowance mailed on Sep. 20, 2017, issued in connection with U.S. Appl. No. 15/131,016, filed Apr. 17, 2016, 9 pages.

Notice of Allowance mailed on Sep. 20, 2019, issued in connection with U.S. Appl. No. 15/872,500, filed Jan. 16, 2018, 7 pages.

Notice of Allowance mailed on Aug. 21, 2017, issued in connection with U.S. Appl. No. 14/520,566, filed Oct. 22, 2014, 7 pages.

Notice of Allowance mailed on Mar. 21, 2023, issued in connection with U.S. Appl. No. 17/536,426, filed Nov. 29, 2021, 23 pages.

Notice of Allowance mailed on May 21, 2020, issued in connection with U.S. Appl. No. 16/550,148, filed Aug. 23, 2019, 7 pages.

Notice of Allowance mailed on Nov. 21, 2018, issued in connection with U.S. Appl. No. 16/107,025, filed Aug. 21, 2018, 14 pages.

Notice of Allowance mailed on Dec. 22, 2017, issued in connection with U.S. Appl. No. 13/904,936, filed May 29, 2013, 10 pages.

Notice of Allowance mailed on Dec. 22, 2021, issued in connection with U.S. Appl. No. 16/672,798, filed Nov. 4, 2019, 14 pages.

Notice of Allowance mailed on Jul. 22, 2020, issued in connection with U.S. Appl. No. 16/459,854, filed Jul. 2, 2019, 11 pages.

Notice of Allowance mailed on Feb. 23, 2023, issued in connection with U.S. Appl. No. 17/686,237, filed Mar. 3, 2022, 9 pages.

Notice of Allowance mailed on Nov. 23, 2016, issued in connection with U.S. Appl. No. 13/904,896, filed May 29, 2013, 18 pages.

Notice of Allowance mailed on Nov. 23, 2016, issued in connection with U.S. Appl. No. 13/904,932, filed May 29, 2013, 5 pages.

Notice of Allowance mailed on Jan. 25, 2017, issued in connection with U.S. Appl. No. 13/341,237, filed Dec. 30, 2011, 7 pages.

Notice of Allowance mailed on Jan. 25, 2021, issued in connection with U.S. Appl. No. 16/372,054, filed Apr. 1, 2019, 11 pages.

Notice of Allowance mailed on Jan. 25, 2022, issued in connection with U.S. Appl. No. 17/127,989, filed Dec. 18, 2020, 11 pages.

Notice of Allowance mailed on Feb. 26, 2016, issued in connection with U.S. Appl. No. 13/864,081, filed Apr. 16, 2013, 13 pages.

Notice of Allowance mailed on Feb. 26, 2019, issued in connection with U.S. Appl. No. 15/263,628, filed Sep. 13, 2016, 11 pages.

Notice of Allowance mailed on Feb. 28, 2024, issued in connection with U.S. Appl. No. 17/710,425, filed Mar. 31, 2022, 7 pages.

Notice of Allowance mailed on Jun. 28, 2017, issued in connection with U.S. Appl. No. 13/904,896, filed May 29, 2013, 17 pages.

Notice of Allowance mailed on Jun. 28, 2019, issued in connection with U.S. Appl. No. 14/956,640, filed Dec. 2, 2015, 8 pages.

Notice of Allowance mailed on Oct. 28, 2019, issued in connection with U.S. Appl. No. 16/551,070, filed Aug. 26, 2019, 8 pages.

Notice of Allowance mailed on Apr. 3, 2019, issued in connection with U.S. Appl. No. 15/135,423, filed Apr. 21, 2016, 9 pages.

(56)     References Cited

OTHER PUBLICATIONS

Notice of Allowance mailed on Mar. 3, 2020, issued in connection with U.S. Appl. No. 13/904,909, filed May 29, 2013, 11 pages.

Notice of Allowance mailed on Mar. 3, 2021, issued in connection with U.S. Appl. No. 16/459,854, filed Jul. 2, 2019, 9 pages.

Notice of Allowance mailed on Oct. 3, 2018, issued in connection with U.S. Appl. No. 16/107,053, filed Aug. 21, 2018, 17 pages.

Notice of Allowance mailed on Dec. 30, 2020, issued in connection with U.S. Appl. No. 16/672,798, filed Nov. 4, 2019, 5 pages.

Notice of Allowance mailed on Oct. 30, 2017, issued in connection with U.S. Appl. No. 14/628,952, filed Feb. 23, 2015, 8 pages.

Notice of Allowance mailed on Aug. 31, 2016, issued in connection with U.S. Appl. No. 14/520,566, filed Oct. 22, 2014, 7 pages.

Notice of Allowance mailed on Apr. 4, 2017, issued in connection with U.S. Appl. No. 13/533,785, filed Jun. 26, 2012, 8 pages.

Notice of Allowance mailed on Apr. 4, 2017, issued in connection with U.S. Appl. No. 13/904,932, filed May 29, 2013, 5 pages.

Notice of Allowance mailed on Dec. 4, 2020, issued in connection with U.S. Appl. No. 17/019,174, filed Sep. 11, 2020, 8 pages.

Notice of Allowance mailed on Mar. 4, 2024, issued in connection with U.S. Appl. No. 18/449,258, filed Aug. 14, 2023, 11 pages.

Sonos v. Google. Respondents' Preliminary Invalidity Claim Charts for U.S. Pat. No. 9,967,615, Exhibits 4-12, dated Mar. 5, 2021, 519 pages.

Sonos's Written Submissions and Evidence before the European Patent Office filed on Aug. 30, 2022 in connection with European Application No. 19178151.7, 16 pages.

Sonos ZonePlayer S5. Press Release. Sonos Multi-Room Music System, Nov. 3, 2009, 2 pages. [produced by Google in WDTX Case No. 6:20-cv-00881 on Mar. 5, 2021].

Sonos. ZonePlayer S5. Product Guide Version:091101, copyright 2004-2009, 180 pages. [produced by Google in WDTX Case No. 6:20-cv-00881 on Mar. 5, 2021].

Sonos ZonePlayer S5. Specification Sheet, 2009, 2 pages. [produced by Google in WDTX Case No. 6:20-cv-00881 on Mar. 5, 2021].

Squeezebox by Logitech. Owner's Guide, 2007, 32 pages.

Squeezebox Network Music Player. Owner's Manual, Slim Devices, 2003, 22 pages.

Stähle et al. "Real-Time Multimedia Session Splitting and Seamless Mobility in Session Initiation Protocol Environments." MMEDIA 2011: 136-141 https://www.iaria.org/conferences2011/MMEDIA11. html, 6 pages. [produced by Google in WDTX Case No. 6:20-cv-00881 on Mar. 5, 2021].

Supplemental Notice of Allowability mailed on Nov. 4, 2015, issued in connection with U.S. Appl. No. 13/864,086, filed Apr. 16, 2013, 2 pages.

Supplemental Notice of Allowance mailed on Dec. 21, 2016, issued in connection with U.S. Appl. No. 13/904,949, filed May 29, 2013, 2 pages.

Thurrott et al. Windows 7 Secrets. Wiley Publishing, Inc., 2009, 1083 pages. [produced by Google in WDTX Case No. 6:20-cv-00881 on Mar. 5, 2021].

Twonky For Mobile. Twonky Mobile Apps. Twonky Suite Media Manager. https://web.archive.org/web/20111129152735/ http://www. twonky.com/products/twonkym, 2 pages. [produced by Google in WDTX Case No. 6:20-cv-00881 on Mar. 5, 2021].

Twonky Mobile App—Quick Review. https://www.youtube.com/ watch?v=L9V_al-bubE. Oct. 16, 2010, 3 pages. [produced by Google in WDTX Case No. 6:20-cv-00881 on Mar. 5, 2021].

Twonky Server 6.0 UI Configuration User Guide, 2010, 13 pages. [produced by Google in WDTX Case No. 6:20- cv-00881 on Mar. 5, 2021].

Twonky Wayback Machine. https://web.archive.org/web/ 20111222005722/ http://www.twonky.com/, Dec. 22, 2011, 1 page. [produced by Google in WDTX Case No. 6:20-cv-00881 on Mar. 5, 2021].

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

Universal Plug and Play ("UPnP") AV Architecture:1 For UPnP, Version 1.0, (Jun. 25, 2002) (D+M_0298151-72) (22 pages).

Unofficial Airplay Protocol Specification (https://nto.github.io/ AirPlay.html#audio-metadata) 34 pages. [produced by Google in WDTX Case No. 6:20-cv-00881 on Mar. 5, 2021].

Update: Spotify now available on Sonos with software 3.3 upgrade. What Hi-Fi?, (available at https://www.whathifi.com/us/news/update-spotifynow-available-sonos-software-33-upgrade), published Sep. 29, 2010, 9 pages. [produced by Google in WDTX Case No. 6:20-cv-00881 on Mar. 5, 2021].

UPnP Design by Example, A Software Developers Guide to Universal Plug and Play Michael Jeronimo and JackWeast, Intel Press (D+M_0401307-818) (Apr. 2003) (511 pages).

UPnP Forum. UPnP Certified Technology- Your Simple Solution for Home, Office and Small Business Interoperability, Sep. 2010, 21 pages. [produced by Google in WDTX Case No. 6:20-cv-00881 on Mar. 5, 2021].

UPnP; "Universal Plug and Play Device Architecture," Jun. 8, 2000; version 1.0; Microsoft Corporation; pp. 1-54.

VideoLAN Wiki. Documentation: Advanced Use of VLC. Last modified Dec. 9, 2014, 13 pages. [produced by Google in WDTX Case No. 6:20-cv-00881 on Mar. 5, 2021].

VLC configure help. VideoLAN Wiki. Last modified Nov. 10, 2016, 9 pages. [produced by Google in WDTX Case No. 6:20-cv-00881 on Mar. 5, 2021].

WDTV Live Set Up Video, YouTube. Dec. 3, 2010, https://www. youtube.com/watch?v=8x1adtpWlaM, 3 pages. [produced by Google in WDTX Case No. 6:20-cv-00881 on Mar. 5,2021].

Welcome to HP Customer Support. HP TouchSmart 300-1330 Desktop PC Product Specifications, Product Number BT613AA, Aug. 27, 2010, 14 pages. [produced by Google in WDTX Case No. 6:20-cv-00881 on Mar. 5, 2021].

"Welcome. You're watching Apple TV." Apple TV 1st Generation Setup Guide, Apr. 8, 2008 http://manuals.info.apple.com/MANUALS/ 0/MA403/en_US/AppleTV_SetupGuide.pdf Retrieved Oct. 14, 14, 40 pages.

"Welcome. You're watching Apple TV." Apple TV 2nd Generation Setup Guide, Mar. 10, 2011 Retrieved Oct. 16, 2014, 36 pages.

"Welcome. You're watching Apple TV." Apple TV 3rd Generation Setup Guide, Mar. 16, 2012 Retrieved Oct. 16, 2014, 36 pages.

Yahoo Groups. Exstreamer. Barix Exstreamer. Access via Wayback Machine http://groups.yahoo.com/group/exstreamer/ Dec. 22, 2013, 1 page.

Yamaha DME 64 Owner's Manual; copyright 2004, 80 pages.

Yamaha DME Designer 3.0 Owner's Manual; Copyright 2008, 501 pages.

Yamaha DME Designer 3.5 setup manual guide; copyright 2004, 16 pages.

Yamaha DME Designer 3.5 User Manual; Copyright 2004, 507 pages.

Yong, Kuan. Control YouTube on the desktop, or the TV . . . wit. https://youtube.googleblog.com/2010/11/control-youtube-on-desktop-or-tv-with.html, Nov. 9, 2010, 8 pages. [produced by Google in WDTX Case No. 6:20-cv-00881 on Mar. 5, 2021].

YouTube Lounge. A compelling YouTube experience in your living room. 10 pages. [produced by Google in WDTX Case No. 6:20-cv-00881 on Mar. 5, 2021].

YouTube Remote. YouTube. Nov. 9, 2010, https://www.youtube. com/watch?v=txIPVu6yngQ, 3 pages. [produced by Google in WDTX Case No. 6:20-cv-00881 on Mar. 5, 2021].

Final Office Action mailed on Jan. 20, 2016, issued in connection with U.S. Appl. No. 14/628,952, filed Feb. 23, 2015, 10 pages.

Final Office Action mailed on Sep. 20, 2017, issued in connection with U.S. Appl. No. 13/904,936, filed May 29, 2013, 22 pages.

Final Office Action mailed on Sep. 21, 2016, issued in connection with U.S. Appl. No. 13/904,923, filed May 29, 2013, 19 pages.

Final Office Action mailed on Apr. 22, 2015, issued in connection with U.S. Appl. No. 13/341,237, filed Dec. 30, 2011, 11 pages.

Final Office Action mailed on Apr. 23, 2019, issued in connection with U.S. Appl. No. 15/131,018, filed Apr. 17, 2016, 19 pages.

(56)        References Cited

OTHER PUBLICATIONS

Final Office Action mailed on Jun. 23, 2015, issued in connection with U.S. Appl. No. 13/904,896, filed May 29, 2013, 16 pages.

Final Office Action mailed on Oct. 23, 2015, issued in connection with U.S. Appl. No. 13/904,944, filed May 29, 2013, 13 pages.

Final Office Action mailed on Aug. 24, 2016, issued in connection with U.S. Appl. No. 13/341,237, filed Dec. 30, 2011, 12 pages.

Final Office Action mailed on Aug. 25, 2015, issued in connection with U.S. Appl. No. 13/864,081, filed Apr. 16, 2013, 15 pages.

Final Office Action mailed on Sep. 25, 2015, issued in connection with U.S. Appl. No. 13/904,949, filed May 29, 2013, 14 pages.

Final Office Action mailed on Aug. 28, 2015, issued in connection with U.S. Appl. No. 13/904,936, filed May 29, 2013, 10 pages.

Final Office Action mailed on Aug. 29, 2016, issued in connection with U.S. Appl. No. 13/904,936, filed May 29, 2013, 21 pages.

Final Office Action mailed on Jun. 29, 2017, issued in connection with U.S. Appl. No. 15/131,016, filed Apr. 17, 2016, 13 pages.

Final Office Action mailed on Mar. 3, 2022, issued in connection with U.S. Appl. No. 16/565,105, filed Sep. 9, 2019, 22 pages.

Final Office Action mailed on Dec. 7, 2022, issued in connection with U.S. Appl. No. 16/565,105, filed Sep. 9, 2019, 19 pages.

Final Office Action mailed on Jan. 7, 2019, issued in connection with U.S. Appl. No. 15/872,500, filed Jan. 16, 2018, 7 pages.

Final Office Action mailed on Feb. 8, 2019, issued in connection with U.S. Appl. No. 13/904,909, filed May 29, 2013, 16 pages.

Final Office Action mailed on Mar. 8, 2021, issued in connection with U.S. Appl. No. 16/565,105, filed Sep. 9, 2019, 18 pages.

First Action Interview Office Action mailed on Jun. 20, 2016, issued in connection with U.S. Appl. No. 14/520,578, filed Oct. 22, 2014, 5 pages.

G. Shultz. SolutionBase: Add multiple monitors without additional video cards using MaxiVista—TechRepublic (Jun. 4, 2004), 11 pages. [produced by Google in WDTX Case No. 6:20-cv-00881 on Mar. 5, 21].

Getting to know Logitech Squeezebox Touch Wi-Fi Music Player. Features Guide, 2010, 31 pages. [produced by Google in WDTX Case No. 6:20-cv-00881 on Mar. 5, 2021].

Google announces Nexus Q, streaming-media ball—CNET News. YouTube. Jun. 27, 2012, https://www.youtube.com/watch?v=LrDVQBGZUbY, 4 pages. [produced by Google in WDTX Case No. 6:20-cv-00881 on Mar. 5, 2021].

*Google Germany GmbH* v. *Sonos, Inc.* Opposition against EP Application No. 19178151.7 dated Jan. 5, 2021, 39 pages.

Google I/O 2011: Keynote Day One. YouTube. May 10, 2011, https://youtu.be/OxzucwjFEEs?t=2808, 4 pages. [produced by Google in WDTX Case No. 6:20-cv-00881 on Mar. 5, 2021].

*Google Ireland Limited* v. *Sonos Inc.*, Reply to Grounds of Appeal, Case No. 3 U 74/21, Aug. 19, 2021, 52 pages.

*Google Ireland Limited* v. *Sonos Inc.*, Application for Discontinuation of Execution, Case No. 3 U 74/21, Jul. 2, 2021, 33 pages.

*Google Ireland Limited* v. *Sonos Inc.*, Substantiation of Appeal, Case No. 3 U 74/21, Jul. 2, 2021, 43 pages.

*Google LLC* v. *Sonos, Inc.*, and *Sonos, Inc.* v. *Google LLC.* Transcript of Proceedings. Northern District of California Case No. 3:20-cv-06754-WHA and Case No. 3:21-cv-07559-WHA, Mar. 30, 2023, 111 pages.

*Google LLC* v. *Sonos, Inc.* Decision Granting Institution of IPR of U.S. Pat. No. 9,967,615, Case IPR2021-01563, dated Apr. 12, 2022, 43 pages.

*Google LLC* v. *Sonos, Inc.* Expert Report of Douglas C. Schmidt on Claim Construction Case Nos. 3:20-cv-06754 and 3:21-cv-07559, Feb. 11, 2022, 183 pages.

*Google LLC* v. *Sonos, Inc.*, Google LLC's Response to the Court's Request for Information (DKT.556). Northern District of California Case No. 3:20-cv-06754-WHA, Mar. 31, 2023, 6 pages.

*Google LLC* v. *Sonos, Inc.*, Google LLC's Responsive Claim Construction Brief: Exhibit 13: Windows Vista The Missing Manual by David Pogue [produced by Google in Northern District of California Case No. 3:20-cv-06754, dated Apr. 4, 2022], 1117 pages.

*Google LLC* v. *Sonos, Inc.*, Google LLC's Responsive Claim Construction Brief: Exhibit 15: McGraw-Hill Dictionary of Scientific and Technical Terms, 6th edition [produced by Google in Northern District of California Case No. 3:20-cv-06754, dated Apr. 4, 2022], 8 pages.

*Google LLC* v. *Sonos, Inc.*, Google LLC's Responsive Claim Construction Brief, Northern District of California Case No. 3:20-cv-06754, dated Apr. 4, 2022, 29 pages.

*Google LLC* v. *Sonos, Inc.*, Google's Motion for Summary Judgment and Non-Confidential Exhibits. Northern District of California Case No. 3:20-cv-06754-WHA, Feb. 6, 2023, 86 pages.

*Google LLC* v. *Sonos, Inc.* Google's Motion for Leave to File Supplemental Claim Construction Briefing. Northern District of California Case No. C 20-06754-WHA, Oct. 6, 2022, 157 pages.

*Google LLC* v. *Sonos, Inc.*, Northern District of California Case No. 3:20-cv-06754, Google's Invalidity Contentions; dated Dec. 6, 2021, 94 pages.

*Google LLC* v. *Sonos, Inc.*, Order Denying Leave to File Supplemental Claim Construction Briefing. Northern District of California Case No. 3:20-cv-06754-WHA, Dec. 21, 2022, 4 pages.

*Google LLC* v. *Sonos, Inc.* Patent Owner Response to Petition for Inter Partes Review and Exhibits 2018-2026 for U.S. Pat. No. 9,967,615, Case IPR2021-01563, Jul. 11, 2022, 697 pages.

*Google LLC* v. *Sonos, Inc.* Patent Owner's Sur-Reply of U.S. Pat. No. 9,967,615, Case IPR2021-01563, dated Oct. 25, 2022, 32 pages.

*Google LLC* v. *Sonos, Inc.*, Petition for IPR of U.S. Pat. No. 9,967,615 and Exhibits 1001-1024, IPR2021-01563, Sep. 28, 2021, Parts 1 -6, 3604 pages.

*Google LLC* v. *Sonos, Inc.*, Petition for IPR of U.S. Pat. No. 9,967,615 and Exhibits 1001-1024, IPR2021-01563, Sep. 28, 2021, Parts 7-13, 3604 pages.

*Google LLC* v. *Sonos, Inc.* Record of Oral Hearing for Case IPR2021-01563 of U.S. Pat. No. 9,967,615, dated Jan. 31, 2023, 51 pages.

*Google LLC* v. *Sonos, Inc.*, Sonos, Inc.'s Opening Claims Construction Brief, Northern District of California Case No. 3:20-cv-06754, dated Mar. 21, 2022, 29 pages.

Chen et al. Session Mobility of SIP Over Multiple Devices. InProceedings of the 4th International Conference on Testbeds and research infrastructures for the development of networks communities. Mar. 18, 2008, 9 pages. [produced by Google in WDTX Case No. 6:20-cv-00881 on Mar. 5, 2021].

Chen et al. "SSIP: Split a SIP session over multiple devices." Computer Standards Interfaces 29.5, Jan. 17, 2007: 531-545. https://www.sciencedirect.com/science/article/abs/pii/S0920548906001310, 15 pages. [produced by Google in WDTX Case No. 6:20-cv-00881 on Mar. 5, 2021].

Chen et al., "What a Juke! A Collaborative Music Sharing System," World of Wireless, Mobile and Multimedia Networks (WOWMOM), 2012 IEEE International Symposium, 2012, 6 pages.

Chinese Patent Office, Chinese Office Action mailed on Jan. 5, 2017, issued in connection with Chinese Application No. 201280069674. 6, 14 pages.

Chinese Patent Office, Chinese Office Action mailed on Nov. 27, 2020, issued in connection with Chinese Application No. 201910421328. 3, 15 pages.

Chinese Patent Office, First Office Action and Translation mailed on Nov. 25, 2019, issued in connection with Chinese Application No. 201810042292.3, 13 pages.

Chinese Patent Office, First Office Action and Translation mailed on Apr. 6, 2021, issued in connection with Chinese Application No. 201911256710.X, 12 pages.

Chinese Patent Office, First Office Action mailed on Mar. 5, 2018, issued in connection with Chinese Application No. 2014800424721, 10 pages.

Chinese Patent Office, First Office Action mailed on Feb. 2, 2018, issued in connection with Chinese Application No. 2014800340980, 11 pages.

Chinese Patent Office, First Office Action mailed on Jan. 2, 2018, issued in connection with Chinese Application No. 201480033788. 4, 16 pages.

(56)        References Cited

OTHER PUBLICATIONS

Chinese Patent Office, First Office Action mailed on Jan. 4, 2018, issued in connection with Chinese Application No. 201480034088. 7, 15 pages.
Chinese Patent Office, Office Action mailed on Dec. 28, 2016, issued in connection with Chinese Application No. 201380040746. 9, 20 pages.
Chinese Patent Office, Second Office Action mailed on Nov. 13, 2018, issued in connection with Chinese Application No. 201480042472. 1, 7 pages.
Chinese Patent Office, Second Office Action mailed on Oct. 18, 2018, issued in connection with Chinese Application No. 201480034098. 0, 7 pages.
Chinese Patent Office, Second Office Action mailed on Nov. 28, 2018, issued in connection with Chinese Application No. 201480033788. 4, 8 pages.
Chinese Patent Office, Second Office Action mailed on Nov. 28, 2018, issued in connection with Chinese Application No. 201480034088. 7, 9 pages.
Chinese Patent Office, Second Office Action mailed on Feb. 5, 2018, issued in connection with Chinese Application No. 201380040746. 9, 16 pages.
Chinese Patent Office, Third Office Action mailed on Mar. 12, 2019, issued in connection with Chinese Application No. 201480034088. 7, 7 pages.
Clementine is a Modern Music Player and Library Organizer. About and Features Clementine 1.0, Jul. 17, 2010 3 pages. [produced by Google in WDTX Case No. 6:20-cv-00881 on Mar. 5, 2021].
Connected, distributed audio solution for your home by barix and Stand-alone, distributed audio solution for your home by barix. Copyright Sep. 2003. Sourced from *Sonos, Inc. v. Lenbrook Industries Limited et al.*—Defendants' Answer to Plaintiff's Complaint—Exhibit A filed Oct. 14, 2019, 3 pages.
ContentDirectory:1 Service Template Version 1.01 For UPnP, Version 1.0 (Jun. 25, 2002) (89 pages).
Nexus Q Accessories on Play Store, 8 pages. [produced by Google in WDTX Case No. 6:20-cv-00881 on Mar. 5, 2021].
Corrected Notice of Allowance mailed on Oct. 6, 2016, issued in connection with U.S. Appl. No. 13/904,949, filed May 29, 2013, 9 pages.
Dell, Inc. "Dell Digital Audio Receiver: Reference Guide," Jun. 2000, 70 pages.
Dell, Inc. "Start Here," Jun. 2000, 2 pages.
DLNA. Digital Living Network Alliance. Overview and Vision Whitepaper 2007, 23 pages. [produced by Google in WDTX Case No. 6:20-cv-00881 on Mar. 5, 2021].
DLNA. DLNA Networked Device Interoperability Guidelines. Mar. 2006, 618 pages. [produced by Google in WDTX Case No. 6:20-cv-00881 on Sep. 10, 2021].
Documentation: Streaming HowTo—VideoLAN Wiki, last modified Nov. 29, 2010, 2 pages. [produced by Google in WDTX Case No. 6:20-cv-00881 on Mar. 5, 2021].
Documentation: Streaming HowTo/Advanced Streaming Using the Command Line—VideoLAN Wiki, last modified No. 9, 2014, 16 pages. [produced by Google in WDTX Case No. 6:20-cv-00881 on Mar. 5, 2021].
Documentation:Streaming HowTo/Command Line Examples—VideoLAN Wiki, last modified Nov. 9, 2014, 6 pages. [produced by Google in WDTX Case No. 6:20-cv-00881 on Mar. 5, 2021].
Documentation: Streaming HowTo/Easy Streaming—VideoLAN Wiki, last modified Feb. 3, 2017, 5 pages. [produced by Google in WDTX Case No. 6:20-cv-00881 on Mar. 5, 2021].
Documentation: Streaming HowTo/Receive and Save a Stream—VideoLAN Wiki, last modified Nov. 10, 2014, 3 pages. [produced by Google in WDTX Case No. 6:20-cv-00881 on Mar. 5, 2021].
Documentation: Streaming HowTo/Stream from Encoding Cards and Other Capture Devices—VideoLAN Wiki (Last modified Jan. 1, 2012), 5 pages. [produced by Google in WDTX Case No. 6:20-cv-00881 on Mar. 5, 2021].

Documentation: Streaming HowTo/Streaming, Muxers and Codecs—VideoLAN Wiki, last modified Feb. 9, 2015, 3 pages. [produced by Google in WDTX Case No. 6:20-cv-00881 on Mar. 5, 2021].
European Patent Office, Communication Pursuant to Rule 114(2) EPC mailed on Aug. 16, 2022, issued in connection with European Application No. 20204548.0, 5 pages.
European Patent Office, Decision Revoking the European Patent mailed on Dec. 20, 2022, issued in connection with European Application No. 19178151.7, 21 pages.
European Patent Office, Decision to Refuse European Patent Application mailed on Dec. 20, 2019, issued in connection with European Application No. 14785247.9, 25 pages.
European Patent Office, European EPC Article 94.3 mailed on Oct. 11, 2023, issued in connection with European Application No. 20206300.4, 4 pages.
European Patent Office, European EPC Article 94.3 mailed on Oct. 12, 2023, issued in connection with European Application No. 20159841.4, 6 pages.
European Patent Office, European EPC Article 94.3 mailed on Sep. 13, 2022, issued in connection with European Application No. 20204548.0, 5 pages.
European Patent Office, European EPC Article 94.3 mailed on Nov. 16, 2022, issued in connection with European Application No. 20204548.0, 5 pages.
European Patent Office, European EPC Article 94.3 mailed on Jul. 21, 2022, issued in connection with European Application No. 21209669.7, 4 pages.
European Patent Office, European EPC Article 94.3 mailed on Feb. 4, 2022, issued in connection with European Application No. 20204548.0, 5 pages.
European Patent Office, European Extended Search Report mailed on Oct. 11, 2022, issued in connection with European Application No. 22179261.7, 8 pages.
European Patent Office, European Extended Search Report mailed on Apr. 14, 2022, issued in connection with European Application No. 21209669.7, 9 pages.
European Patent Office, European Extended Search Report mailed on Sep. 15, 2022, issued in connection with European Application No. 22181265.4, 10 pages.
European Patent Office, European Extended Search Report mailed on Aug. 16, 2017, issued in connection with EP Application No. 16160758.5, 9 pages.
European Patent Office, European Extended Search Report mailed on Jun. 23, 2021, issued in connection with European Application No. 20206300.4, 8 pages.
European Patent Office, European Extended Search Report mailed on Apr. 29, 2021, issued in connection with European Application No. 20204548.0, 8 pages.
*Sonos, Inc v. Google Ireland Limited*, Google's Statement and Supplemental Response to their Reply of Feb. 22, 2021. Case No. 327 O 36/21. Apr. 15, 2021, 37 pages.
*Sonos, Inc v. Google Ireland Limited*, Google's Summary of Arguments of D4. Exhibit submitted with Comments on the Hearing Case No. 327 O 36/21. Apr. 29, 2021, 2 pages.
*Sonos, Inc. v. Google Ireland Limited*. Judgment. Case No. 327 O 36/21. Apr. 29, 2021, 28 pages.
*Sonos, Inc. v. Google Ireland Limited*, Minutes of Preliminary Injunction Hearing. Case No. 327 O 36/21. Apr. 29, 2021, 3 pages.
*Sonos, Inc. v. Google Ireland Limited*, Reply to Preliminary Injunction Submission for alleged patent infringement EP3554005 Case No. 327 O 36/21. Feb. 22, 2021, 131 pages.
*Sonos, Inc. v. Google Ireland Limited*, Sonos's Reply to Respondents Brief dated Apr. 15, 2021. Case No. 327 O 36/21. Apr. 26, 2021. 6 pages.
*Sonos, Inc. v. Google Ireland Limited*, Sonos's Reply to Respondents Response dated Feb. 22, 2021. Case No. 327 O 36/21. Apr. 18, 2021. 64 pages.
*Sonos, Inc. v. Google LLC*, Declaration of Douglas C. Schmidt filed in Western District of Texas Waco Division Case No. 6:20-cv-881-ADA, dated Apr. 27, 2021, 40 pages.
*Sonos, Inc. v. Google LLC*, Declaration of Kevin C. Almeroth filed in Western District of Texas Waco Division Case No. 6:20-cv-881-ADA, dated Apr. 27, 2021, 29 pages.

(56) References Cited

OTHER PUBLICATIONS

*Sonos, Inc.* v. *Google LLC*, Defendant Google LLC's Response Claim Construction Brief filed in Western District of Texas Waco Division Case No. 6:20-cv-881-ADA, dated Jun. 1, 2021, 35 pages.

*Sonos, Inc.* v. *Google LLC*, Defendant Google LLC's Sur-Reply Claim Construction Brief filed in Western District of Texas Waco Division Case No. 6:20-cv-881-ADA, dated Jun. 29, 2021, 20 pages.

*Sonos, Inc.* v. *Google LLC*, Dr. Kyriakakis' Declaration in Support of Google LLC's Responsive Claim Construction Brief filed in Western District of Texas Waco Division Case No. 6:20-cv-881-ADA, dated Jun. 1, 2021, 233 pages.

*Sonos, Inc.* v. *Google LLC*, Exhibit 26: Rebuttal Declaration of Kevin C. Almeroth filed in Western District of Texas Waco Division Case No. 6:20-cv-881-ADA, dated Jun. 15, 2021, 258 pages.

*Sonos, Inc.* v. *Google LLC*, Exhibit 27: Reply Declaration Douglas C. Schmidt filed in Western District of Texas Waco Division Case No. 6:20-cv-881-ADA, dated Jun. 15, 2021, 162 pages.

*Sonos, Inc.* v. *Google LLC*. Google's Motion for Summary Judgment Pursuant to the Court's Patent Showdown Procedure. Northern District of California Case No. 3:20-cv-06754-WHA, Apr. 14, 2022, 33 pages.

*Sonos, Inc.* v. *Google LLC*. Google's Reply in Support of Google's Motion for Summary Judgment Pursuant to the Court's Patent Showdown Procedure. Exhibit 1: Declaration of Samrat Bhattacharjee. Northern District of California Case No. 3:20-cv-06754-WHA, May 19, 2022, 5 pages.

*Sonos, Inc.* v. *Google LLC*. Order RE Motions For Summary Judgment. Northern District of California Case No. 3:20-cv-06754-WHA, Apr. 13, 2023, 33 pages.

*Sonos, Inc.* v. *Google LLC*, Plaintiff Sonos, Inc.'s Opening Claim Construction Brief filed in Western District of Texas Waco Division Case No. 6:20-cv-881-ADA, dated Apr. 27, 2021, 38 pages.

*Sonos, Inc.* v. *Google LLC*, Plaintiff Sonos, Inc.'s Reply Claim Construction Brief filed in Western District of Texas Waco Division Case No. 6:20-cv-881-ADA, dated Jun. 15, 2021, 22 pages.

*Sonos, Inc.* v. *Google LLC*, Sonos's Response to Second Request for Information. Northern District of California Case No. 3:20-cv-06754-WHA, Mar. 31, 2023, 5 pages.

*Sonos, Inc.* v. *Google LLC*, WDTX Case No. 6:20-cv-00881, Google's Answer and Counterclaims; dated Jan. 8, 2021, 39 pages.

*Sonos, Inc.* v. *Google LLC*, WDTX Case No. 6:20-cv-00881, Google's Final Invalidity Contentions; dated Sep. 10, 2021, 90 pages.

*Sonos, Inc.* v. *Google LLC*, WDTX Case No. 6:20-cv-00881, Google's Preliminary Invalidity Contentions dated Mar. 5, 2021, 93 pages.

*Sonos, Inc.* v. *Implicit, LLC*: Declaration of Roman Chertov in Support of the Inter Partes Review of U.S. Pat. No. 8,942,252 dated Mar. 9, 2018, 81 pages.

*Sonos, Inc.* v. *Lenbrook Industries Limited et al.*, Defendants' Answer to Plaintiff's Complaint, filed Oct. 14, 2019, 66 pages.

*Sonos, Inc.* v. *Lenbrook Industries Limited et al.*, Defendants' First Amended Answer and Counterclaims to Plaintiff's Complaint, filed Nov. 14, 2019, 66 pages.

*Sonos Inc.* vs. *Google Ireland Limited and Google Germany GmbH*, Application for a Preliminary Injunction, Affidavit of Sebastian Fuchs, Cases 327 O 36/21 and 327 O 378/20, Aug. 10, 2021, 27 pages.

*Sonos Inc.* vs. *Google Ireland Limited and Google Germany GmbH*, Application for a Preliminary Injunction, Cases 327 O 36/21 and 327 O 378/20, Aug. 10, 2021, 56 pages.

*Sonos Inc.* vs. *Google Ireland Limited*, Request for Penalty Pursuant to § 890 ZPO, Affidavit of Jakob Dandl, Case No. 327 O 36/21, Jun. 17, 2021, 12 pages.

*Sonos Inc.* vs. *Google Ireland Limited*, Request for Penalty Pursuant to § 890 ZPO, Case No. 327 O 36/21, Jun. 17, 2021, 21 pages.

*Sonos, Inc.* vs. *Google LLC*, Markman Hearing Transcript, Civil Action No. W-20-CV-881, Aug. 10, 2021, 86 pages.

*Sonos, Inc.* vs. *Google LLC*, Patent Owner Sonos, Inc.'s Preliminary Response to Petition for Inter Partes Review os U.S. Pat. No. 9,967,615 with Exhibits 2001-2012, Case No. IPR2021-01563, dated Jan. 25, 2022, 284 pgs.

Sonos, "Sonos Play: 5 (Formerly S5) Product Guide," 2004-2011, 14 pages.

Sonos Play:5 (available at https://youtu.be/XG1_L_214G0), Jul. 14, 2011, 2 pages. [produced by Google in WDTX Case No. 6:20-cv-00881 on Mar. 5, 2021].

Sonos's Response to Communication pursuant to Rule 114(2) EPC enclosing third-party observations concerning the patentability of invention in connection with European Application No. 20204548.0, Sep. 9, 2022, 16 pages.

Sonos's Response to Summons of the Opponent before the European Patent Office filed on Aug. 30, 2022 in connection with European Application No. 19178151.7, 16 pages.

Sonos's Response to Summons to Attend Oral Proceedings before the European Patent Office filed on Jul. 5, 2022 in connection with European Application No. 19178151.7, 343 pages.

*Sonos* v. *Google*. Respondents' Final Invalidity Claim Charts for U.S. Pat. No. 10,779,033, Exhibits 4-13, dated Sep. 10, 2021, 531 pages.

*Sonos* v. *Google*. Respondents' Final Invalidity Claim Charts for U.S. Pat. No. 9,967,615, Exhibits 4-13, dated Sep. 10, 2021, 565 pages.

*Sonos* v. *Google*. Respondents' Preliminary Invalidity Claim Charts for U.S. Pat. No. 10,779,033, Exhibits 4-12, dated Mar. 5, 2021, 473 pages.

Japanese Patent Office, Notice of Rejection mailed on Dec. 20, 2016, issued in connection with Japanese Application No. 2016-509069, 6 pages.

Japanese Patent Office, Office Action mailed on Jan. 10, 2017, issued in connection with Japanese Patent Application No. 2016-509046, 7 pages.

Japanese Patent Office, Office Action mailed on Feb. 14, 2017, issued in connection with Japanese Patent Application No. 2016-509047, 9 pages.

Japanese Patent Office, Office Action mailed on Oct. 18, 2016, issued in connection with Japanese Application No. 2015-520287, 6 pages.

Japanese Patent Office, Office Action mailed on Mar. 1, 2016, issued in connection with JP Application No. 2015-520287, 7 pages.

JBL On Air Wireless Airplay Speaker Dock, copyright 2010, 21 pages. [produced by Google in WDTX Case No. 6:20-cv-00881 on Mar. 5, 2021].

Johnson, Steve. Microsoft Windows 7 On Demand. Perspection Inc. 2010, 576 pages. [produced by Google in WDTX Case No. 6:20-cv-00881 on Mar. 5, 2021].

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Komiya et al. Use Cases for Session Mobility in Multimedia Applications. Matsushita Electric (Panasonic). Retrieved online at URLhttps://www.ietf.org/proceedings/65/slides/mmusic-9.pdf submitted in Grounds of Appeal for EP No. 12861517.6 on Nov. 23, 2017, 7 pages.

K.S. Bhogal. Expanding Your Screen Real Estate with MaxiVista (https://www.informit.com/articles/printerfriendly/484551) (Jul. 7, 2006), 4 pages. [produced by Google in WDTX Case No. 6:20-cv-00881 on Mar. 5, 2021].

Kumparak, Greg, "Limili Identifies That Song That's Playing, Adds Its To Your Grooveshark Collection", TechCrunch, Nov. 12, 2010, 6 pages, XP055221098.

Lawler, R. YouTube Remote app released, controls Leanback on GTV or PC from your Android phone. Engadget. Nov. 9, 2010, 4 pages. [produced by Google in WDTX Case No. 6:20-cv-00881 on Mar. 5, 2021].

Logitech. Squeezebox Boom. All-in-one network music player. User Guide, copyright 2008, 22 pages. [produced by Google in WDTX Case No. 6:20-cv-00881 on Mar. 5, 2021].

(56)          References Cited

OTHER PUBLICATIONS

Logitech. Squeezebox Radio. Wi-Fi Internet Radio Feature Guide, copyright 2009, 31 pages. [produced by Google in WDTX Case No. 6:20-cv-00881 on Mar. 5, 2021].

Louderback, Jim, "Affordable Audio Receiver Furnishes Homes With MP3," TechTV Vault. Jun. 28, 2000 retrieved Jul. 10, 2014, 2 pages.

Mate et al., "Movable-Multimedia: Session Mobility in Ubiquitous Computing Ecosystem", XP055019030, 2006, 6 pages.

MaxiVista. User Manual, 2004, 12 pages. [produced by Google in WDTX Case No. 6:20-cv-00881 on Mar. 5, 2021].

MaxiVista v2. User's Manual, 2005, 22 pages. [produced by Google in WDTX Case No. 6:20-cv-00881 on Mar. 5, 2021].

"Mirage Media Server: The Definitive Guide to the World's First Cloud-based Media Server", Autonomic, 2012, 16 pages, XP055221677.

Moran, Joseph. Bartels Media MaxiVista Pro. PracticallyNetworked. com, Jul. 31, 2008, 3 pages. [produced by Google in WDTX Case No. 6:20-cv-00881 on Mar. 5, 2021].

Moran, Joseph. Extend Your PC Display Over the Network with MaxiVista 4. Practically Networked, Aug. 1, 2017, 2 pages. [produced by Google in WDTX Case No. 6:20-cv-00881 on Mar. 5, 2021].

Motorola, "Simplefi, Wireless Digital Audio Receiver, Installation and User Guide," Dec. 31, 2001, 111 pages.

Murph, Darren. IOGEAR's Wireless USB to VGA kit extends your monitor sans wires, Aug. 25, 2008, 4 pages. [produced by Google in WDTX Case No. 6:20-cv-00881 on Mar. 5, 2021].

Music by Google—Beta—Google I/O 2011—04. YouTube. May 11, 2011, https://www.youtube.com/watch? v=FC90GqKNGd8, 3 pages. [produced by Google in WDTX Case No. 6:20-cv-00881 on Mar. 5, 2021].

Nemerovski, John. iW1 AirPlay Wireless Audio System Review. mymac.com. Nov. 28, 2011, 6 pages. [produced by Google in WDTX Case No. 6:20-cv-00881 on Mar. 5, 2021].

NewsRoom.Slim Devices Introduces Squeezebox. PR Newswire. Nov. 18, 2003, 2 pages.

Nexus. Nexus Q Guidebook. Edition 1.0. Copyright 2012. 27 pages [produced by Google in Hamburg Regional Court, Case No. 327 O 378/20 on Jan. 5, 2021].

Nexus Q User Guide, May 2012, 28 pages.

Niles SVL-4 Speaker Selection/vol. Control System Installation Operation Guide. Copyright 1999. Sourced from *Sonos, Inc.* v. *Lenbrook Industries Limited et al.*, Defendants' Answer to Plaintiff's Complaint—Exhibit C, filed Oct. 14, 2019, 16 pages.

Non-Final Office Action mailed Jul. 22, 2021, issued in connection with U.S. Appl. No. 16/672,798, filed Nov. 4, 2019, 12 pages.

Non-Final Office Action mailed Feb. 23, 2017, issued in connection with U.S. Appl. No. 13/904,923, filed May 29, 2013, 21 pages.

Non-Final Office Action mailed on Feb. 2, 2016, issued in connection with U.S. Appl. No. 13/904,936, filed May 29, 2013, 14 pages.

Non-Final Office Action mailed on Mar. 2, 2015, issued in connection with U.S. Appl. No. 13/904,896, filed May 29, 2013, 15 pages.

Non-Final Office Action mailed on Dec. 6, 2019, issued in connection with U.S. Appl. No. 16/389,906, filed Apr. 19, 2019, 16 pages.

Non-Final Office Action mailed on Feb. 7, 2017, issued in connection with U.S. Appl. No. 14/520,578, filed Oct. 22, 2014, 5 pages.

Non-Final Office Action mailed on Oct. 8, 2014, issued in connection with U.S. Appl. No. 13/341,237, filed Dec. 30, 2011, 12 pages.

Non-Final Office Action mailed on Feb. 9, 2017, issued in connection with U.S. Appl. No. 15/131,016, filed Apr. 17, 2016, 12 pages.

Non-Final Office Action mailed on Jun. 9, 2022, issued in connection with U.S. Appl. No. 17/710,425, filed Mar. 31, 2022, 14 pages.

Non-Final Office Action mailed on Mar. 9, 2017, issued in connection with U.S. Appl. No. 13/904,936, filed May 29, 2013, 20 pages.

Non-Final Office Action mailed on May 9, 2017, issued in connection with U.S. Appl. No. 14/628,952, filed Feb. 23, 2015, 12 pages.

Non-Final Office Action mailed on Mar. 10, 2015, issued in connection with U.S. Appl. No. 13/864,081, filed Apr. 16, 2013, 13 pages.

Non-Final Office Action mailed on Aug. 12, 2016, issued in connection with U.S. Appl. No. 13/904,909, filed May 29, 2013, 21 pages.

Non-Final Office Action mailed on May 12, 2022, issued in connection with U.S. Appl. No. 17/686,237, filed Mar. 3, 2022, 25 pages.

Non-Final Office Action mailed on Feb. 13, 2015, issued in connection with U.S. Appl. No. 13/904,936, filed May 29, 2013, 10 pages.

Non-Final Office Action mailed on Mar. 13, 2015, issued in connection with U.S. Appl. No. 13/904,949, filed May 29, 2013, 20 pages.

Non-Final Office Action mailed on Dec. 14, 2016, issued in connection with U.S. Appl. No. 13/341,237, filed Dec. 30, 2011, 5 pages.

Non-Final Office Action mailed on Jun. 16, 2016, issued in connection with U.S. Appl. No. 13/904,932, filed May 29, 2013, 15 pages.

Non-Final Office Action mailed on Oct. 16, 2018, issued in connection with U.S. Appl. No. 15/131,018, filed Apr. 17, 2016, 16 pages.

Non-Final Office Action mailed on Oct. 16, 2018, issued in connection with U.S. Appl. No. 15/263,628, filed Sep. 13, 2016, 7 pages.

Non-Final Office Action mailed on Apr. 17, 2018, issued in connection with U.S. Appl. No. 14/956,640, filed Dec. 2, 2015, 15 pages.

Non-Final Office Action mailed on Mar. 17, 2016, issued in connection with U.S. Appl. No. 13/904,923, filed May 29, 2013, 15 pages.

Non-Final Office Action mailed on Oct. 17, 2018, issued in connection with U.S. Appl. No. 15/135,423, filed Apr. 21, 2016, 13 pages.

Non-Final Office Action mailed on Nov. 18, 2015, issued in connection with U.S. Appl. No. 13/904,896, filed May 29, 2013, 18 pages.

Non-Final Office Action mailed on Nov. 18, 2015, issued in connection with U.S. Appl. No. 13/904,932, filed May 29, 2013, 12 pages.

Non-Final Office Action mailed on Aug. 19, 2015, issued in connection with U.S. Appl. No. 13/864,075, filed Apr. 16, 2013, 18 pages.

Non-Final Office Action mailed on Aug. 19, 2021, issued in connection with U.S. Appl. No. 16/565,105, filed Sep. 9, 2019, 17 pages.

Non-Final Office Action mailed on Jan. 19, 2016, issued in connection with U.S. Appl. No. 13/341,237, filed Dec. 30, 2011, 10 pages.

Non-Final Office Action mailed on Apr. 20, 2018, issued in connection with U.S. Appl. No. 15/872,500, filed Jan. 16, 2018, 7 pages.

Non-Final Office Action mailed on Aug. 21, 2017, issued in connection with U.S. Appl. No. 15/131,018, filed Apr. 17, 2016, 9 pages.

Non-Final Office Action mailed on Feb. 22, 2017, issued in connection with U.S. Appl. No. 14/520,566, filed Oct. 22, 2014, 14 pages.

Non-Final Office Action mailed on Apr. 23, 2015, issued in connection with U.S. Appl. No. 13/904,944, filed May 29, 2013, 12 pages.

Non-Final Office Action mailed on Feb. 23, 2017, issued in connection with U.S. Appl. No. 15/131,840, filed Apr. 18, 2016, 12 pages.

Non-Final Office Action mailed on Jun. 24, 2020, issued in connection with U.S. Appl. No. 16/672,798, filed Nov. 4, 2019, 10 pages.

Non-Final Office Action mailed on Mar. 24, 2015, issued in connection with U.S. Appl. No. 13/864,086, filed Apr. 16, 2013, 14 pages.

Non-Final Office Action mailed on May 24, 2023, issued in connection with U.S. Appl. No. 17/536,922, filed Nov. 29, 2021, 15 pages.

(56)  References Cited

OTHER PUBLICATIONS

Non-Final Office Action mailed on Jan. 25, 2013, issued in connection with U.S. Appl. No. 13/341,237, filed Dec. 30, 2011, 9 pages.

Non-Final Office Action mailed on Jul. 25, 2016, issued in connection with U.S. Appl. No. 14/628,952, filed Feb. 23, 2015, 12 pages.

Non-Final Office Action mailed on Mar. 25, 2016, issued in connection with U.S. Appl. No. 13/904,949, filed May 29, 2013, 13 pages.

Non-Final Office Action mailed on Dec. 26, 2019, issued in connection with U.S. Appl. No. 16/550,148, filed Aug. 23, 2019, 20 pages.

Non-Final Office Action mailed on Jul. 26, 2017, issued in connection with U.S. Appl. No. 14/520,578, filed Oct. 22, 2014, 10 pages.

Non-Final Office Action mailed on May 26, 2021, issued in connection with U.S. Appl. No. 17/127,989, filed Dec. 18, 2020, 8 pages.

Non-Final Office Action mailed on Nov. 26, 2013, issued in connection with U.S. Appl. No. 13/341,237, filed Dec. 30, 2011, 15 pages.

Non-Final Office Action mailed on Dec. 28, 2015, issued in connection with U.S. Appl. No. 14/520,566, filed Oct. 22, 2014, 10 pages.

Non-Final Office Action mailed on May 28, 2015, issued in connection with U.S. Appl. No. 14/628,952, filed Feb. 23, 2015, 9 pages.

Non-Final Office Action mailed on Apr. 29, 2020, issued in connection with U.S. Appl. No. 16/372,054, filed Apr. 1, 2019, 34 pages.

Non-Final Office Action mailed on Jun. 29, 2016, issued in connection with U.S. Appl. No. 13/533,785, filed Jun. 26, 2012, 19 pages.

Non-Final Office Action mailed on Jun. 29, 2018, issued in connection with U.S. Appl. No. 13/904,909, filed May 29, 2013, 18 pages.

Non-Final Office Action mailed on Aug. 3, 2022, issued in connection with U.S. Appl. No. 16/565,105, filed Sep. 9, 2019, 18 pages.

Non-Final Office Action mailed on Jun. 3, 2019, issued in connection with U.S. Appl. No. 13/904,909, filed May 29, 2013, 16 pages.

Non-Final Office Action mailed on Dec. 30, 2014, issued in connection with U.S. Appl. No. 14/520,566, filed Oct. 22, 2014, 10 pages.

Non-Final Office Action mailed on Oct. 30, 2018, issued in connection with U.S. Appl. No. 14/956,640, filed Dec. 2, 2015, 11 pages.

Non-Final Office Action mailed on Jan. 6, 2022, issued in connection with U.S. Appl. No. 17/145,268, filed Jan. 8, 2021, 15 pages.

Non-Final Office Action mailed on Mar. 7, 2019, issued in connection with U.S. Appl. No. 15/872,500, filed Jan. 16, 2018, 12 pages.

Non-Final Office Action mailed on Jul. 8, 2019, issued in connection with U.S. Appl. No. 16/389,906, filed Apr. 19, 2019, 14 pages.

Non-Final Office Action mailed on Jun. 9, 2020, issued in connection with U.S. Appl. No. 16/565,105, filed Sep. 9, 2019, 34 pages.

Non-Final Office Action mailed on Mar. 9, 2023, issued in connection with U.S. Appl. No. 17/661,357, filed Apr. 29, 2022, 22 pages.

Notice of Allowance mailed Oct. 9, 2015, issued in connection with U.S. Appl. No. 13/864,086, filed Apr. 16, 2013, 14 pages.

Notice of Allowance mailed Jul. 26, 2021, issued in connection with U.S. Appl. No. 17/127,989, filed Dec. 18, 2020, 10 pages.

Notice of Allowance mailed Apr. 28, 2021, issued in connection with U.S. Appl. No. 16/448,896, filed Jun. 21, 2019, 20 pages.

Notice of Allowance mailed Jul. 28, 2021, issued in connection with U.S. Appl. No. 16/448,896, filed Jun. 21, 2019, 11 pages.

Notice of Allowance mailed Aug. 3, 2021, issued in connection with U.S. Appl. No. 16/372,054, filed Apr. 1, 2019, 11 pages.

Notice of Allowance mailed Jun. 30, 2021, issued in connection with U.S. Appl. No. 17/145,268, filed Jan. 8, 2021, 8 pages.

Notice of Allowance mailed on Jun. 6, 2016, issued in connection with U.S. Appl. No. 13/904,944, filed May 29, 2013, 5 pages.

Notice of Allowance mailed on Nov. 7, 2016, issued in connection with U.S. Appl. No. 14/520,578, filed Oct. 22, 2014, 14 pages.

* cited by examiner 216          204          216

214

300

304

302

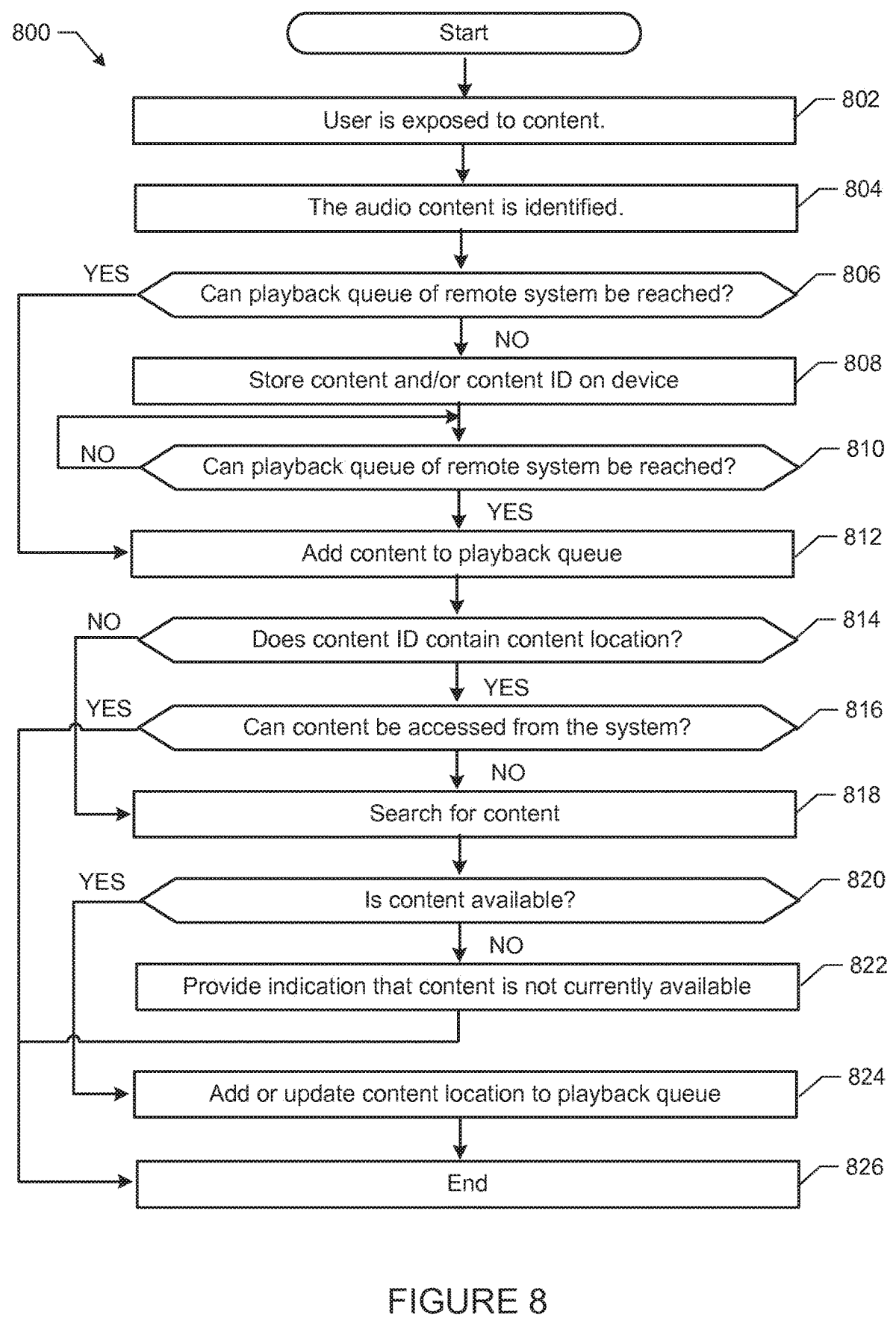

800 ⟍

Start

User is exposed to content. — 802

The audio content is identified. — 804

YES ⟵ Can playback queue of remote system be reached? — 806

NO

Store content and/or content ID on device — 808

NO ⟵ Can playback queue of remote system be reached? — 810

YES

Add content to playback queue — 812

NO ⟵ Does content ID contain content location? — 814

YES

YES ⟵ Can content be accessed from the system? — 816

NO

Search for content — 818

YES ⟵ Is content available? — 820

NO

Provide indication that content is not currently available — 822

Add or update content location to playback queue — 824

End — 826

FIGURE 8

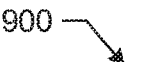
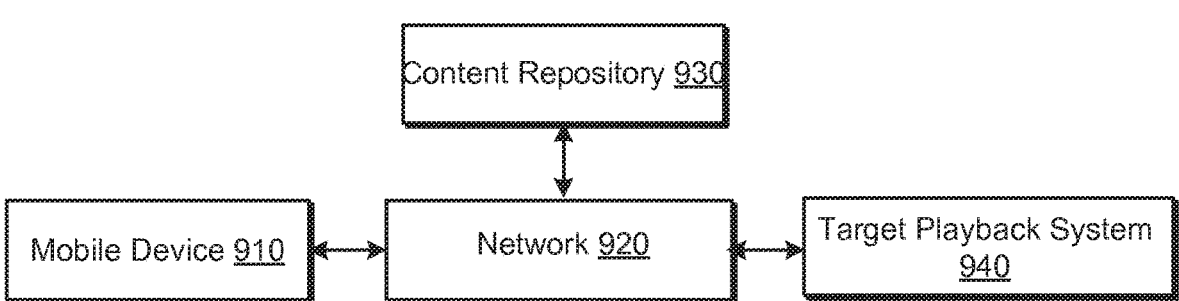
FIGURE 9

REMOTE PLAYBACK QUEUE

CROSS-REFERENCE TO RELATED APPLICATIONS

This application is a continuation of U.S. application Ser. No. 17/686,237, titled "Remote Playback Queue" (12-0302-CON0222), filed on Mar. 3, 2022, and currently pending; U.S. application Ser. No. 17/686,237 is a continuation of U.S. application Ser. No. 16/565,105, titled "Adding to a Remote Playlist" (12-0302-CON0919), filed on Sep. 9, 2019, and abandoned on Jun. 16, 2023; U.S. application Ser. No. 16/565,105 is a continuation of U.S. application Ser. No. 15/131,018, titled "Adding to a Remote Playlist" (12-0302-CON0316B), filed on Apr. 17, 2016, and abandoned on Nov. 14, 2019; U.S. application Ser. No. 15/131,018 is a continuation of U.S. application Ser. No. 13/533,785, titled "Systems and Methods for Networked Music Playback Including Remote Add to Queue" (12-0302), filed on Jun. 26, 2012, and issued on Jun. 6, 2017, as U.S. Pat. No. 9,674,587. The entire contents of U.S. application Ser. No. 17/686,237; 16/565,105; 15/131,018; and 13/533,785 are incorporated by reference herein.

FIELD OF THE DISCLOSURE

The disclosure is related to consumer electronics and, more particularly, to providing music for playback via one or more devices on a playback data network.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

FIG. 8 illustrates a flow diagram for an example method to facilitate remote multimedia identification and playback; and FIG. 9 shows an illustration of an example system to facilitate identification and transfer of content to a playback network.

Figure 1:
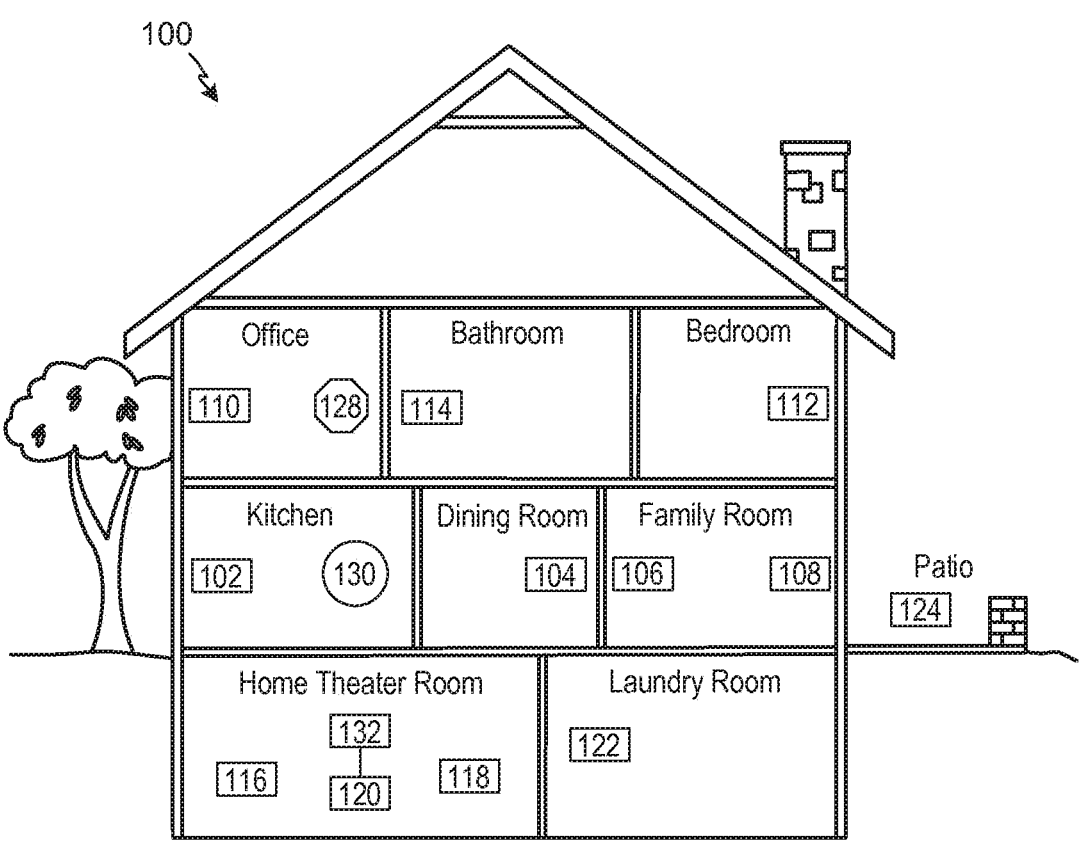
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

Listening to audio content out loud can be a social activity that involves family, friends, or both. Audio content may include, for instance, music, talk radio, books, audio from television, and other audible material. For example, in a household, people may play music out loud at parties and other social gatherings. In such an environment, people may wish to play the music in one listening zone or multiple listening zones simultaneously, such that the music in each listening zone may be synchronized, without audible echoes or glitches. Such an experience may be further enriched when people, for example, browse audio sources, add a music track to a playback queue, learn more about a music track (such as track title or track artists), or view what music track is next in the playback queue.

Listening to audio content out loud can also be an individual experience. For example, an individual may play music out loud for themselves in the morning before work, in the evening during dinner, or at other times throughout the day at home, work, or on the road. For these individual experiences, the individual may choose to either use headphones or limit the out loud playback of audio content to a single zone or area.

Discovery of audio can also be an important element of the experience. By way of illustration, discovery may involve friends telling each other about their latest favorite new song or artist. In some cases, discovery may involve browsing music magazines and periodicals that regularly review the latest releases. In addition, some online music services, radio stations, and disc jockeys are also means for people to share and discover new music or audio.

Generally speaking, discovery can occur at any time or place where, for instance, someone is listening, talking, or thinking about audio; however, new audio discoveries can be easily lost and forgotten. For example, a user may hear a song while shopping at the local mall and want to add that song to a playback queue in their home system (or some other system like a vehicle audio system). In another example, a user may listen to a radio program on their drive home from work and want to add that program to their home system. In another example, a user who has created a playlist on their system may want to share their playlist with a friend by adding the playlist to their friend's playback queue on their friend's system. In yet another example, a user has signed up for an online music service that automatically delivers new tracks to a playback queue in the user's system. Many other examples, similar and different from the above, are described herein and illustrate different types of discovery.

Certain embodiments are provided to prevent or reduce lost opportunities associated with new audio discoveries. For instance, an embodiment allows a user to remotely add audio content to a playback system, such as his or her home audio system. In another instance, an embodiment allows a user to discover audio remotely, capture it on a mobile device or some other network capable device, and subsequently provide the audio to his or her home audio system upon return. According to an embodiment, audio discovery can successfully occur even when the user is remote from a playback system, and yet be experienced on the playback system at a convenient time without getting lost and forgotten.

Certain embodiments are provided to offer a unique wired, wireless, or both wired and wireless audio solution that allows content, or pointers to content (which includes any kind of content identification or address), to be added to a playback queue from a remote location. A playback queue represents a queue of audio content, or pointers to audio content, to be played by a particular playback system and may contain, among other items, a mix of tracks or songs, albums, playlists, radio stations, programs, streaming content, or other audible items. Depending on the playback system, audio content from the playback queue may be played using headphones or out loud in a single listening zone or across multiple listening zones simultaneously and in synchrony, if so desired. In an example, a system may include one or more audio players, often referred to herein as zone players or playback devices or players, and controllers, which may also be a player in some instances. A controller may be used to control the playback system, and can include capabilities for, among other things, browsing and selecting audio content for playback, viewing and editing audio content in one or more playback queues, or grouping and ungrouping zone players into one or more listening zones, etc. According to an embodiment, the playback system may operate as a distributed system such that each controller has full control over the entire playback system, and each player has the ability to play audio content from the either a same audio source or a different audio source as another player.

Certain embodiments are provided to allow, audio content, or pointers to content, to be discovered or gathered remotely and provided to a device of the local playback system upon return to the local playback system. For instance, a user might hear a fun song in a restaurant and collect information about the song using a mobile device such as a smart phone, tablet computer, or laptop. Upon return to the user's local playback system, such as a system located at their home, work, or car, for example, the mobile device may transfer the content, or a pointer to the content, to the local playback system. The local playback system may access and play the song when convenient.

Certain embodiments are provided to facilitate remote configuration of content for playback via a multimedia playback network are disclosed. Certain embodiments provide an example method that includes facilitating identification of multimedia content being played, the identification including at least one of a content identifier associated with the content and the content itself. The example method includes relaying at least one of the content identifier and the content to a playback system located remotely from a location of the multimedia content playback, at least one of the content identifier and the content remotely added for playback at the playback system.

Certain embodiments provide a computer readable storage medium including instructions for execution by a processor, the instructions, when executed, cause the processor to implement a method to provide content to a local playback network. The example method includes facilitating identification of multimedia content being played, the identification including at least one of a content identifier associated with the content and the content itself. The example method includes relaying at least one of the content identifier and the content to a playback system located remotely from a location of the multimedia content playback, at least one of the content identifier and the content remotely added for playback at the playback system.

Certain embodiments provide a multimedia playback device including a wireless communication interface to communicate with a local playback network and a multimedia content source and a processor. The processor is arranged to facilitate identification of multimedia content being played, the identification including at least one of a content identifier associated with the content and the content itself, and to relay at least one of the content identifier and the content to a playback system located remotely from a location of the multimedia content playback, so that at least one of the content identifier and the content are remotely added for playback at the playback system.

Many other embodiments are provided and described herein.

II. An Example Operating Environment

Referring now to the drawings, in which like numerals can refer to like parts throughout the figures, FIG. 1 shows an example system 100 in which one or more of the embodiments disclosed herein can be practiced or implemented.

By way of illustration, system 100 represents a home with multiple zones, though the home could have been configured with only one zone. Each zone, for example, may represent a different room or space, such as an office, bathroom, bedroom, kitchen, dining room, family room, home theater room, utility or laundry room, and patio. While not shown here, a single zone might also include multiple rooms if so configured. One or more of zone players 102-124 are shown in each respective zone. A zone player 102-124, also referred to as a playback device, multimedia unit, speaker, player and so on, provides audio, video, and/or audiovisual output. A controller 130 (e.g., shown in the kitchen for purposes of illustration) provides control to the system 100. Controller 130 may be fixed to a zone, or alternatively, mobile such that it can be moved about the zones. System 100 may also include more than one controller 130. System 100 illustrates an example whole house audio system, though it is understood that the technology described herein is not limited to its particular place of application or to an expansive system like a whole house audio system 100 of FIG. 1.

a. Example Zone Players

Figure 2A:
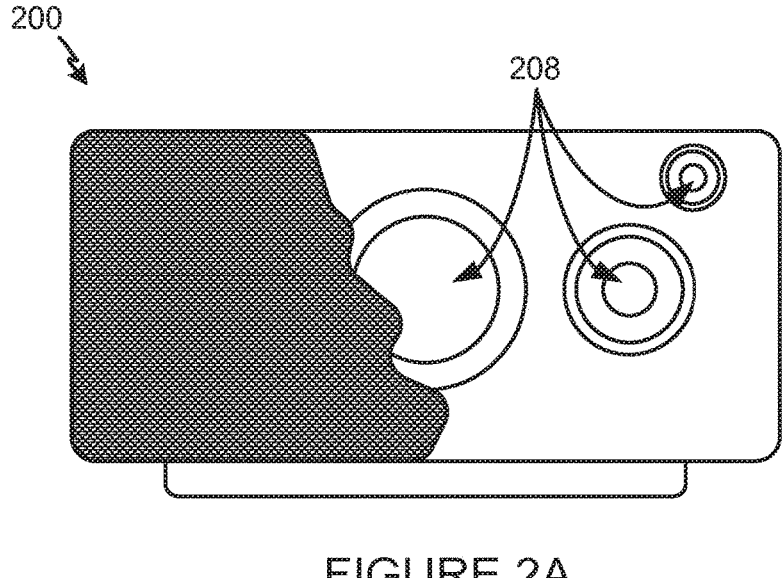
FIG. 2A shows an illustration of an example zone player having a built-in amplifier and speakers.
Figure 2B:
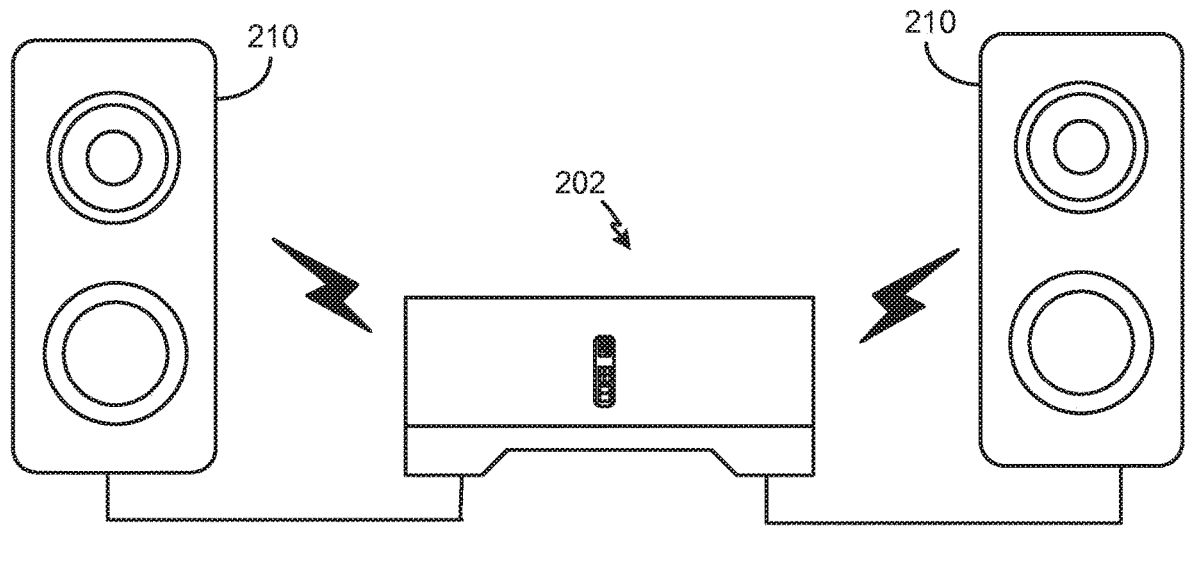
FIG. 2B shows an illustration of an example zone player having a built-in amplifier and connected to external speakers.
Figure 2C:
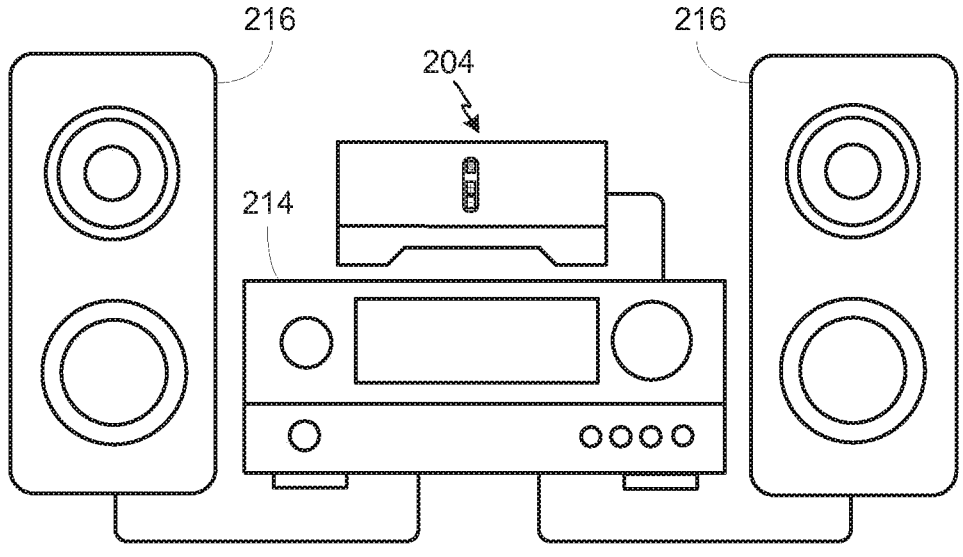
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer might include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played. Each item in the queue may comprise a uniform resource identifier (URI) or some other identifier. The URI or identifier can point the zone player to the audio source. The source might be found on the Internet (e.g., the cloud), locally from another device over data network 128, the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, California presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS™ product offerings. For example, a zone player might include a wired or wireless headphone. In yet another example, a zone player might include a sound bar for television. In yet another example, a zone player can include or interact with a docking station for an Apple IPOD™ or similar device.

b. Example Controllers

Figure 3:
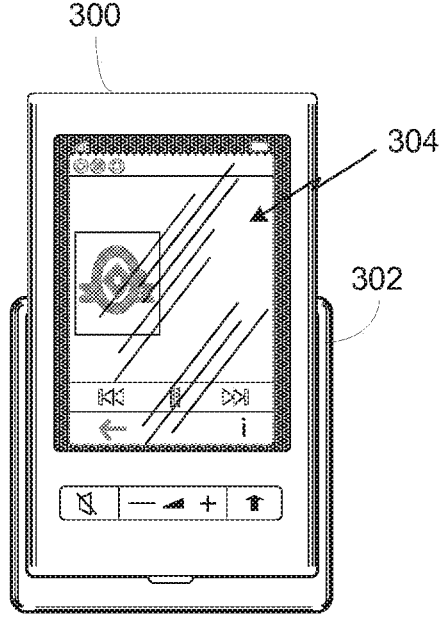
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination might happen, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™ IPAD™, ANDROID™ powered phone, or any other smart phone or network-enabled device can be used as controller 130. An application running on a laptop or desktop PC or Mac can also be used as controller 130. Such controllers may connect to system 100 through an interface with data network 128, a zone player, a wireless router, or using some other configured connection path. Example controllers offered by SONOS, Inc. of Santa Barbara, California include a "Controller 200," "SONOS® CONTROL," "SONOS® Controller for iPhone," "SONOS® Controller for IPAD™," "SONOS® Controller for ANDROID™, "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration

100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SonosNet protocol, developed by SONOS, Inc. of Santa Barbara. SonosNet represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and reconnecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Zone Players

Figure 4:
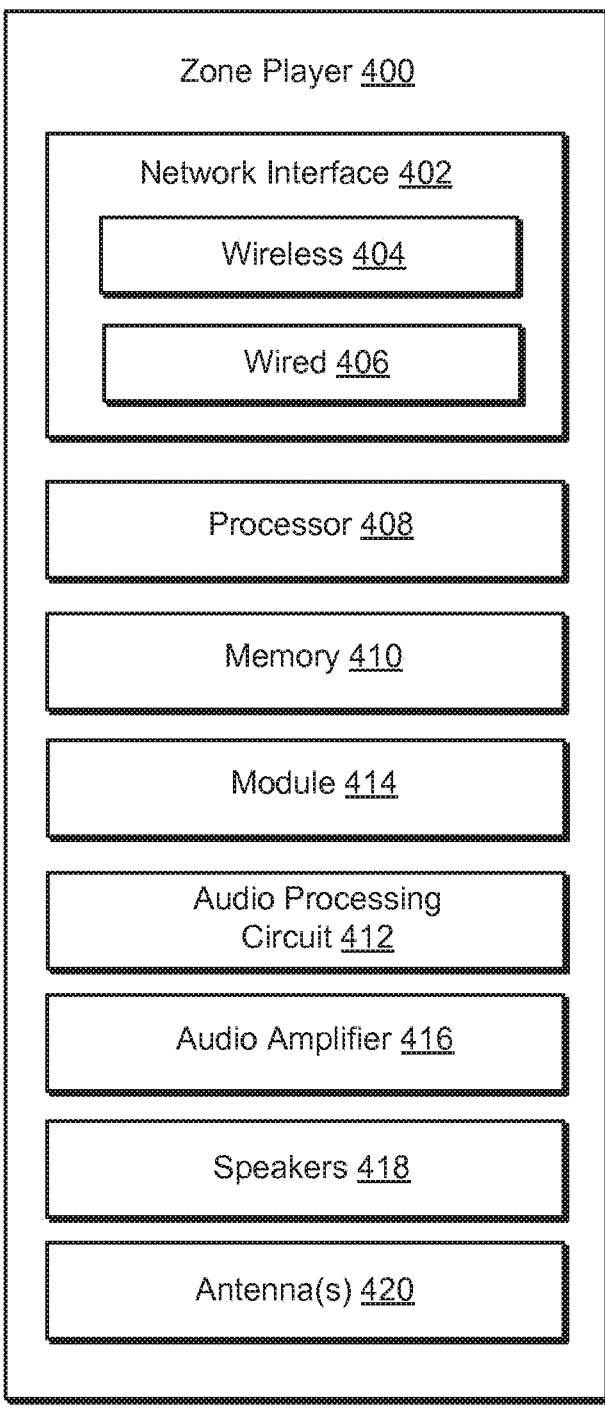
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as an RF interface, provides network interface functions for the zone player 400 to wirelessly communicate with other devices (e.g., other zone player(s), speaker(s), receiver(s), component(s) associated with the data network 128, and so on) in accordance with a communication protocol (e.g., any of the wireless standards including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a URL or some other identifier). In some embodiments, a task might be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include necessary circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (for low frequencies), a mid-range driver (middle frequencies), and a tweeter (high frequencies), for example. An enclosure can be sealed or ported, for example. Each transducer may be driven by its own individual amplifier.

A commercial example, presently known as the PLAY:5, is a zone player with a built-in amplifier and speakers that is capable of retrieving audio directly from the source, such as on the Internet or on the local network, for example. In particular, the PLAY:5 is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from Internet radio stations, online music and video services, downloaded music, analog audio inputs, television, DVD, and so on, can be played from the PLAY:5.

IV. Controller

Figure 5:
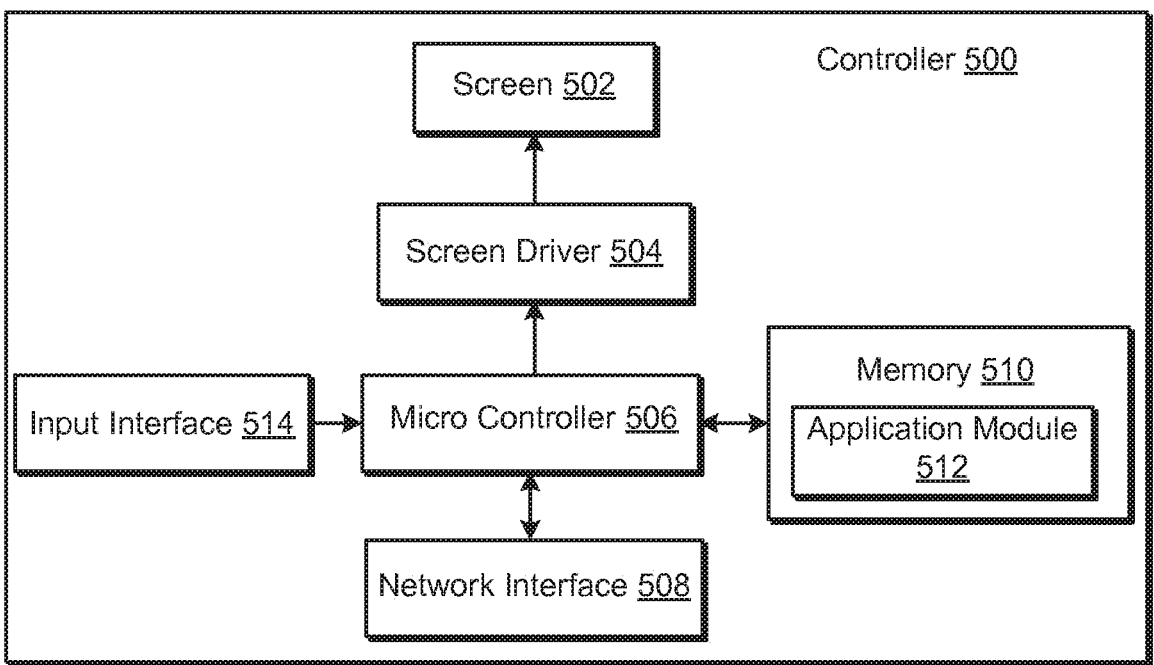
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b 802.11g, 802.11n, or 802.15). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE©, IPAD© or any other smart phone or network-enabled device (e.g., a networked computer such as a PC or MAC©) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration.

Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
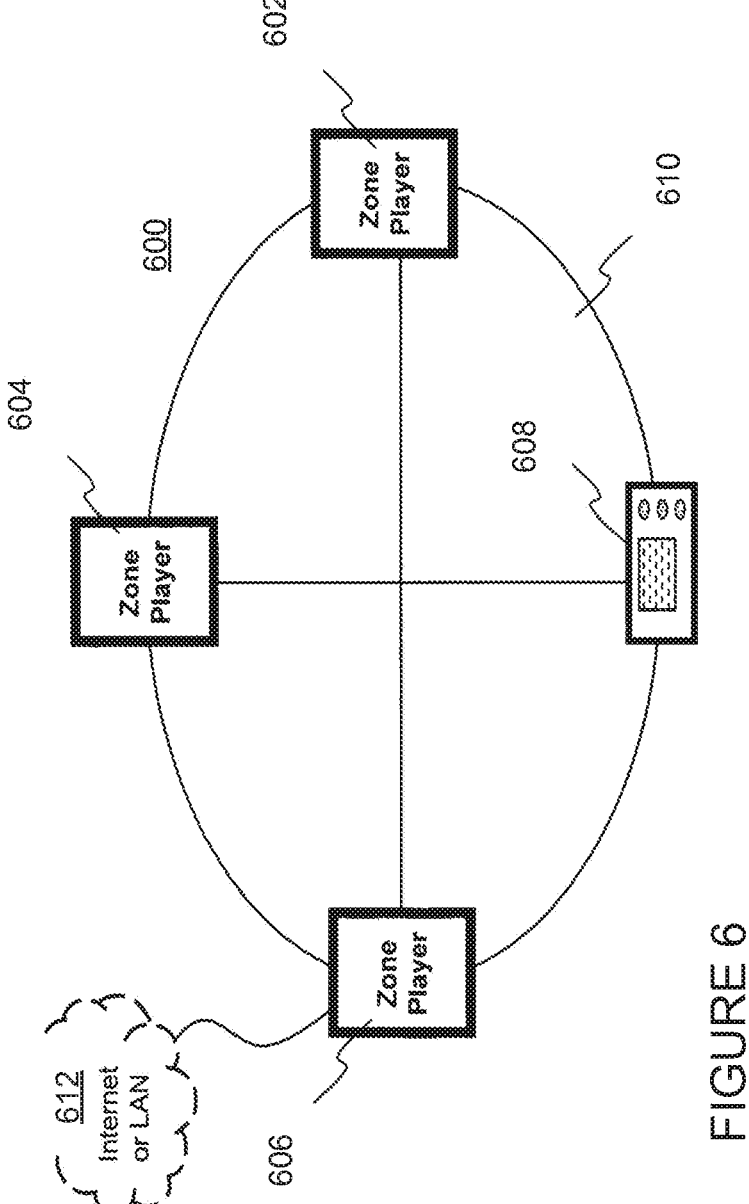
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may come/and go from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSE-HOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), SSID (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSE-HOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example System Configuration

Figure 7:
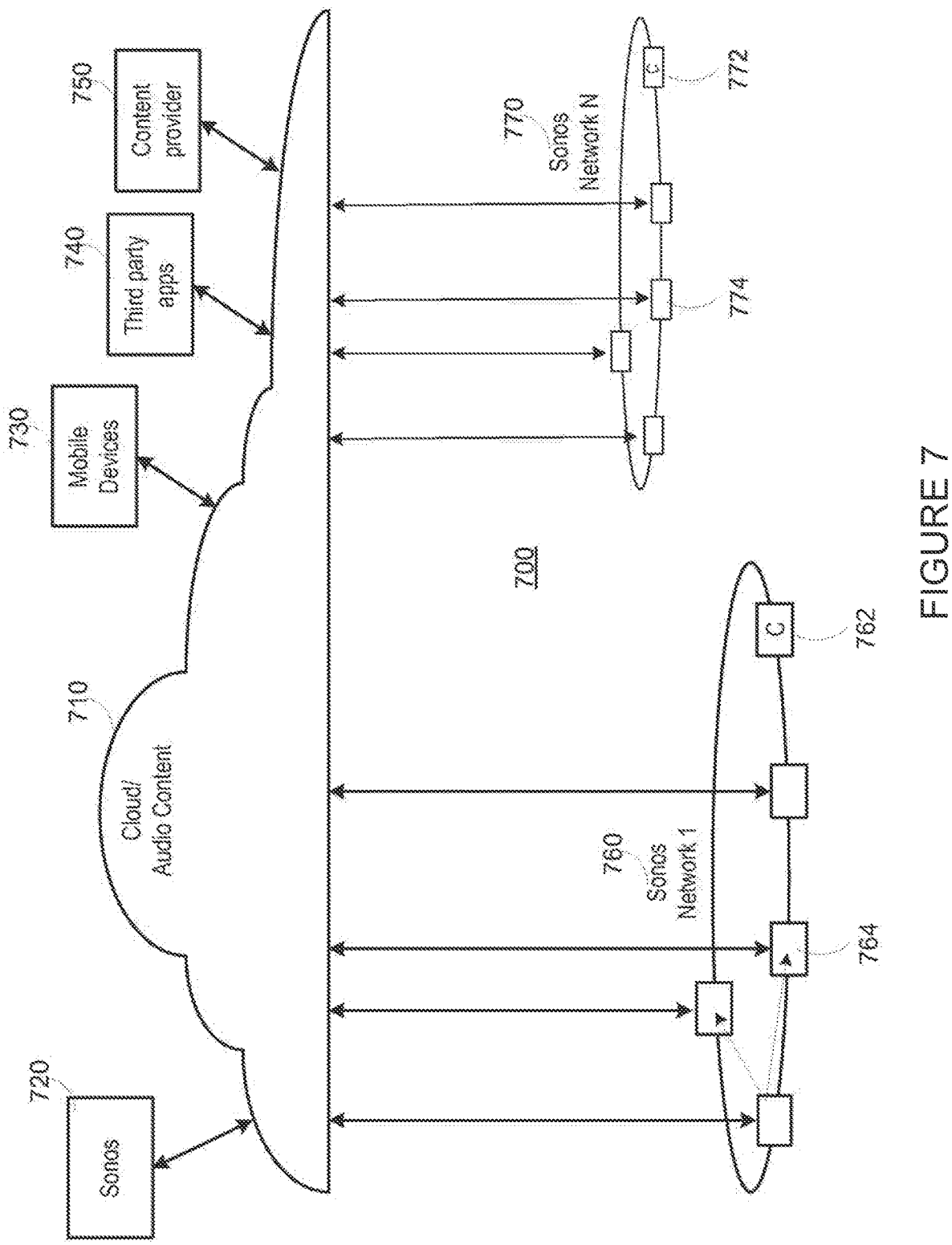
FIG. 7 shows a system including a plurality of networks including a cloud-based network and at least one local playback network.

FIG. 7 shows a system including a plurality of networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 700 of FIG. 7, a plurality of content providers 720-750 can be connected to one or more local playback networks 760-770 via a cloud and/or other network 710. Using the cloud 710, a multimedia playback system 720 (e.g., SONOS™), a mobile device 730, a third party application 740, a content provider 750 and so on can provide multimedia content (requested or otherwise) to local playback networks 760, 770. Within each local playback network 760, 770, a controller 762, 772 and a playback device 764, 774 can be used to playback audio content.

VII. Remote Queue Manipulation

In an example system such as the one shown in FIG. 1, 6 or 7, where a SONOS system, for example, including one or more playback devices and one or more controllers, is connected together in a local area network (LAN), the ability to add audio content (or pointers to the content) to a playback queue of the system from a remote location not in the local area network may be valuable. Further, it may be valuable to store content, content identification, or pointers to content, on a mobile device when away from the network, and add the content or pointers to content to the playback queue upon return to the network.

As suggested previously, remote queue manipulation such as "remote add to queue" differs from conventional queue manipulation such as "Add to Queue" because, unlike the conventional "Add to Queue" which is initiated from within the system on the local area network, "remote add to queue" is initiated from a point outside the system beyond the local area network. In other words, audio content is discovered at a remote location and subsequently added to a playback queue of a system. The audio content may be added to the playback queue remotely or locally depending on the configuration. Illustrative examples of remote queue manipulation, as applied to different scenarios and different system devices are discussed below.

A. Playback Queue

In an example system, a playback queue may include, for each track or item, information about the item including, for example, the title, artist, genre, etc. The playback queue may also include the audio content, or it may include a uniform resource locator (URL) or some other content identification identifying where the content is located. The audio content may be located on a device in the local area network (including a device connected directly to the zone player itself) or it may reside in the "cloud" over the Internet. In the "cloud" includes access to computer servers under the control of content providers like Internet radio stations, on-demand services, and so on. As additional audio content is selected, the content may be added to the playback queue such that the content may be played following an order (e.g., sequentially or in random order). In one example, there may be a playback queue for each zone or zone group (including a zone scene, which comprises dynamically grouping players responsive to a time or some other action), and a system may include multiple playback queues.

In the example system, a playback queue may be stored locally or remotely over the Internet. In one example embodiment, a playback queue is stored in memory on a device in the same local area network as the playback system. For example, a zone player such as the zone player shown in FIG. 2 and/or FIG. 4 may store a playback queue in memory 410. In another example, a zone player in a zone group may store a playback queue in memory for the zone group. In yet another example, a controller such as the controller shown in FIG. 3 and/or FIG. 5 may store a playback queue in memory 510. In another example embodiment, a playback queue may be stored remotely over the Internet in memory on a "cloud server" or network storage device. For example, the SONOS™ server 720 in FIG. 7 may be used to store one or more playback queues for SONOS™ systems 760 and 770. In yet another example embodiment, the playback queue is stored in memory on a combination of devices including devices both local to the system and remote over the Internet. In each case, the player or group of players of a zone or zone group access the playback queue to determine the content for playback.

B. Queue Manipulation

In an example system, conventional queue manipulation may be done by a user using one or more controllers, such as the controller shown in FIG. 3 and/or FIG. 5, communicating with the system either directly to a system component or through the local area network. Content may be played or added to the queue by the user selecting options on the controller such as "Play Now", "Play Next", "Add to Queue", "Replace Queue", and so on.

In addition to playing audio tracks from a playback queue, the example system may also conventionally play audio streams directly without adding them to the playback queue. For instance, this may be done by selecting an available stream (e.g., PANDORA™ RHAPSODY™, SPOTIFY™, etc., streaming radio station) and using the "Play Now" option on the controller. When an audio stream is played in this way, any audio stream currently being played may be stopped and discarded or otherwise not received and/or played by the system. However, the playback queue of audio tracks may not be affected. In this example system, zones and zone groups may also play streaming audio content.

C. Remote Add to Queue

An example remote add to queue method may be implemented on an example system such that one or more users may, among other things, add tracks or songs, albums, playlists, radio stations, programs, videos, and/or streaming content to a playback queue of a system from a remote location. In some embodiments, the playback queue for which audio content is initially sent may be chosen on the fly (e.g., at the time of identification or discovery) or during a "remote add to queue" settings configuration procedure. Subsequently, in some embodiments, the audio content may be sent via the cloud to various playback queues on the local playback system.

In an embodiment, the audio content is added to a single playback queue in a system. For example, from a location that is remote from the playback network, a user may add content to a single playback queue that is associated with a zone or zone group. The user using a user interface (UI) may choose the single playback queue remotely or upon return to the system. Using an example above to illustrate, the user might add a jazz song to the playback queue associated with kitchen zone. In yet another example, a user might add the jazz song to a playback queue associated with a zone scene, wherein a zone scene might be a dynamically created zone group based upon a trigger like a specific time of day or some other action.

In another embodiment, there is a single playback queue that is used for all content added by a remote user. A user may then look to this specialized playback queue to determine when and where to play the audio, for instance. In one example embodiment, a user may select content from the specialized playback queue, and save or copy the content to one or more other locations in the local system. For example, a user may select content from the specialized playback queue and add it to a personal playlist associated with the user or system. In another example, a user may select content from the specialized playback queue and add it to a playback queue of a zone or zone group in the system. In yet another example, a user may select streaming content (e.g., Internet radio station, streaming program, etc.) from the specialized playback queue and add it to a "favorites" location for easy access to the streaming content in the future. The content may be added from the specialized playback queue to various playlists and/or queues of the system via any of point and click, drag and drop, copy and paste, and other types of options.

In yet another embodiment, there is a playback queue that is associated or tied to each user. In other words, each user (or a subset of users) associated with a playback system may have a playback queue for which content can be added according to the embodiments described herein. For example, John might have a playback queue associated with John on his playback network (e.g., "John's queue").

In another embodiment, the audio content is added to multiple playback queues in a system. For example, from a location that is remote from the playback network, a user may add content to multiple zones or zone groups in a system (e.g., added to a playback queue for the kitchen, one for the family room, and so on). In yet another embodiment, the audio content is added to multiple playback queues in multiple systems. For example, a user may add content to the playback queues in multiple systems so that each system has access to the content (e.g., an office system, a home system, a vacation home system, a car, a boat, and so on).

In yet another embodiment, a user may send the audio content to a local playback system, in which a different user can access or play the audio content on the local playback system. This may be useful, for example, to substantially and simultaneously share and discover new content with other users in a remote location. For example, a sister may send audio content home to play and be heard by her brother on the local playback system. In one example embodiment, the content may be added to the playback queue and immediately played. For example, "remote play now" may be used to provide "Play Now" functionality from a point outside the system beyond the local area network. In another example embodiment, the content may be added to the playback queue and a user may be alerted, and invited to play the new content. In one instance, the user may be alerted to play the new content using a visual indication (e.g., a message or alert symbol) displayed on a display screen of a controller. In another instance, the user may be alerted to play the new content using an audio tone or message that may be played by a zone player or controller. In yet another instance, the user may be alerted to play the new content using messaging over an external network, such as a text message, email, or voicemail message that may be transmitted over the public switched telephone network (PSTN) or Internet.

In some embodiments, remote add to queue includes first identifying or discovering the audio content and second transferring the content or content identification to a playback queue on a remote system. In certain embodiments, the two steps of identifying audio content and transferring the content or content identification to a playback queue on a remote system can be implemented in a single action. For example, a single button-press or selection by a user on a UI of mobile device or a computing device located remote from the playback network may be used to identify and transfer content or content identification to a remote playback queue. In other embodiments, the first step of identifying the audio content is separate, and may be implemented by other mechanisms, from the action to transfer the content or content identification to the playback queue. Identification of the audio content might include a device and software application on the device sampling the audio via a microphone and looking up the audio in a database based on the sampling. Alternatively, identification of the audio content might include a software application on the device that identifies the content by processing the metadata or tags associated with the content. Once the device identifies the audio content, a UI associated with the device may display and/or store the result.

D. Control Application

In one embodiment, remote add to queue may be implemented using a control application that resides on a remote device such as a mobile phone (e.g., IPHONE™ or ANDROID™), a tablet PC (e.g., IPAD™ or ANDROID™ tablet), an IPOD™, or a computer. The control application may be a stand-alone application on the device, or it may be a subset of functionality provided by an application on the device.

The control application may be interactive, such that a user uses the control application to add content to the playback queue. In some embodiments, a single action button press might add the content to the playback queue. In some embodiments, multiple actions taken by the user might add the content to the playback queue. The control application might be a part of a control application for the playback system, such as a Sonos controller.

In one application, a user uses the control application to add content to the playback queue, while in another application, a program is used with the control application to add content to the playback queue in an automated fashion. For example, a program on a remote computer server in the cloud may add newly released pop singles to a playback queue of local playback system.

In some embodiments, the user or controller must be authenticated prior to being allowed to add content to a playback queue in a system from a remote location. In one example embodiment, the user must "sign in" such as by entering a username, a password, or a username/password combination to be authenticated. In another example embodiment, the user may be authenticated simply by the identification of the control application being used on a device to add content to the system. For example, a SONOS™ Controller application on a device may be registered as such a control application.

In one example embodiment, the control application communicates (e.g., sends messages) through the Internet to the system directly to manipulate the queue. In another example embodiment, the control application communicates through the Internet to a "cloud-based server," such as the SONOS™ server at 720 in FIG. 7, that may either host the remote playback queue or act as a gateway to the individual system, whereby each system can be uniquely identified by the household identifier (or HHID) and located by its IP address.

In certain embodiments, the playback queue of the system may not be reachable from the control application on a device that is remote from the system. For example, the user may be using a control application on a portable device that does not have Internet connectivity. In certain embodiments, even if the playback queue is not reachable by the device, it may be desirable to store the content, content identification, and/or content pointer on the device until a time when the playback queue can be reached. At that time, the content, content identification, and/or pointer are transferred to the playback queue.

In some embodiments, metadata associated with the content is stored with the content. Metadata might include the time the song was heard and/or identified by the user, the location and/or place or business where the audio was first heard, and so on. For example, metadata might include information that identifies a song was heard at a particular restaurant at 7:35 PM. Such information might be useful to users who care to know when a particular song or audio was heard (e.g., an anniversary dinner). In some embodiments, a controller of the playback network may display information associated with the metadata during (or some other time) playback of the audio content. This metadata, which relates to when and/or where the audio content was heard or identified, is contrasted with information like album art, which can be retrieved from a content provider based on the name of the song or song ID, for example.

In one embodiment, content is sent via an email or text message and when at home, a user may select a link in the email or text message to add the content to the playback system. In such an example, the controller can contain a software application that facilitates email and/or text. Other examples include adding a link to the song via a Twitter account or Facebook, for example.

E. Example Remote Add to Queue to User's Own System

Certain examples allow a user to send content to his or her playback network from a remote location. For example, a user is in a restaurant picking up dinner and she hears a song that she likes playing from the restaurant's speakers. Using an application, e.g., a content identification application running on her tablet or smartphone (e.g., an IPAD™ or IPHONE™) she can identify the song. A copy of the song or an identifier associated with the song (e.g., song name, alphanumeric song identifier, etc.) is sent to her home playback system (e.g., a SONOS™ system) via the cloud or other network transfer. She can then play the song at home some time later. In certain embodiments, a single click or action facilitates the transfer, so as to reduce or minimize the "capture time." In certain embodiments, the song, track, or station identifier (ID) is transferred to the user's mobile device (e.g., a smartphone) for later transfer to the user's home network when the user is back within a transfer range of the home playback network.

On the user's home playback system (e.g., a SONOS™ system, an Apple AIRPLAY™ system, etc.), the song may be added to a queue or holding place, for example. The home system may first check to see if the song is available to play on the local system (e.g., checking with an online streaming music service such as RHAPSODY™ or PANDORA™, the user's content provider, checking with free content providers, and so on). If the song is not available, the playback system can provide a way to get the song, such as by purchasing the song from a for-pay store or service (e.g., ITUNES™, AMAZON™, SPOTIFY™, etc.) or accessing the song from a free content provider.

Once retrieved, the song can be placed in a queue or holding place on a specific player within the user's local playback system. For example, the user can add the song to a living room queue, add the song to Group 1, add the song to a workout zone scene, etc. The song may be added to a playlist, for example. The song may be added to another holding place, such as a multimedia drive, local storage, cloud music archive, etc. The song may be held in the cloud by a content and/or systems provider, such as SONOS™, for example.

In certain embodiments, the relayed song or song ID may be tagged with a location or other indication of where the user sent it (e.g., from the restaurant, gym, airport, nightclub, etc.) so that the user knows or remembers from where the song was sent. For example, a timestamp and/or location indicating from where/when the song was sent may be provided as a default (e.g., 3:15 pm at the Hard Rock Café, Las Vegas). In certain embodiments, a message may be sent along with the song (e.g., "My boys loved this song!", etc.).

F. Example Remote Add to Queue to Another User's System

Certain examples allow a user to send a song or other multimedia content to another user's playback network from a remote location. In this example, as with the above example, a song or song ID (or other multimedia content or content ID) is retrieved and sent to a remote system, except that a first user has sent the song or song ID to another user's (e.g., a friend or acquaintance) local playback network. For example, a user is sitting at his home computer (or laptop computer at home or outside of the home, or a smart phone, and so on), and he hears a song that he thinks his cousin would enjoy. The user then adds the song to his cousin's home network. The song may be added to a queue or holding place on the other user's playback network. The transfer may even include a message (e.g., "Scott, I thought you would enjoy this song!").

In certain embodiments, the second user (e.g., the first user's "friend" or relative) may authorize the first user to add the content to the second user's playback system. Authorization may take place ahead of time or on the fly, for example. An on-the-fly example may include the friend receiving a pop-up message on his or her home network controller stating that a friend wants to share a song. The friend is then prompted to approve or disapprove the request (e.g., press OK to add song; press NOT OK to ignore), for example. In certain embodiments, the second user (e.g., the first user's "friend") may be a connection from a social site such as Facebook®, Twitter®, etc. For example, a list of friends or acquaintances may be developed from a social media site such that a user can push a song suggestion to all or part of that list of friends/acquaintances. In certain embodiments, a relayed song can be played immediately, if allowed, can be placed in a queue or holding area for later/scheduled playback, etc.

G. Example Sending to Second User's Playback Network from a First User's Playback Network Certain examples allow a first user to send a song or other multimedia content to a second user's playback network from the first user's playback network. For example, the first user is listening at home and wants to share a song with a friend, who also has a compatible media content playback system. The first user sends the song or song ID to the second user, where the song is placed in a queue, playlist, or other holding place on the second user's playback network. The song or song ID may be held in the cloud by a content playback service and/or system provider, for example. The song may be identified, retrieved and readied for immediate, scheduled, and/or later playback as disclosed above, for example.

H. Example Remote Add to Queue from a Third Party to a User's System

Certain examples allow a remote third party to send a song or other multimedia content to a user's playback network from a remote location. For example, the user may sign up for periodic or a one-time receipt of a song (or playlist), which gets placed in the user's holding area (e.g., a queue) for playback via the user's content playback system. For example, a playback system and/or service provider may send out fun playlists to interested customers.

In certain embodiments, one or more playback systems/ networks can be visualized as a group or network of households in which permission(s) for each group can be set independently. Permissions may include "remote play now," "remote play next," "remote add to queue," "remote add to library," etc. For example, a user may have "remote play" and "remote add to queue" permissions for his or her "Personal" Group, which includes Home and Office locations. According to these permissions, the user can remotely add songs to the Home and Office playback networks as well as play content on one or both of those systems. On the other hand, a user may have only "remote add to queue" permission for its "Friend" group, where the user can only add songs to households in this group (but not play them).

VIII. Example Method of Remote Discovery and Add to Queue

FIG. 8 illustrates a flow diagram for an example method 800 to facilitate remote add to queue. At block 802, a user is exposed to the audio content. This could be, for example, a user listening to a song at a party or dance club, a user hearing a radio program while driving in the car, a user discovering a new artist while listening to music on a friend's playback system, or even a user with a tune stuck in their head from previous experience. The audio content might also relate to a video, such as movie or television content.

At block 804, the audio content is identified and a set of one or more identifiers, referred to collectively as the "content ID," are associated with the content. The content ID may include, for example, one or more of the following: track name or program identifier, track artist, track album or station identifier, URL or other location identifier identifying where the content is located, timestamp of when the content was identified, user identifier, message tag with alpha numeric comments provided by the user, etc. The content may be identified, for example, using an online music identification service such as SHAZAM™, ECHOPRINT, GRACENOTE, MIDOMI, TUNATIC, etc. The user may, for example, use an application (for example, provided by an online music identification service) on their mobile phone to identify the audio and capture the content ID.

However, music identification services or similar services may not have the correct ID as it relates to the user's content provider. As such, certain embodiments can use software to further locate and associate the correct ID based on the user's account. For example, if a user maintains a SPO-TIFY™ account, then the system may identify the song and use a table lookup to find the appropriate ID for SPO-TIFY™. As a result, the playback network will be able to retrieve the correct song.

At block 806, a determination is made if the playback queue of the system can be reached from the remote location. For example, a user may not currently have access to the Internet or other means to access the playback queue of the system. In another example, the user may have access to the Internet, but may not be able to reach the playback queue system due to security restrictions (e.g., the system may be protected by a firewall, etc.)

If the playback queue of the system cannot be reached from the remote location, then the content and/or content ID is stored as shown in block 808, until a time when the playback queue is reachable. For example, if a user, using a mobile device to add the content to the playback queue of the system, is unable to reach the playback queue of a system, then the content ID may be stored on that mobile device until a time when the device can reach the playback queue of the system.

Periodically, or based on an event, such as a mobile device connecting to a wireless network, a determination is made if the playback queue of the system can be reached as shown in block 810.

At block 812, the playback queue can be reached and the content ID is used to add content to the playback queue. As mentioned previously, in the example system, the playback queue may include, for each item, the URL or other identification identifying where the content is located. In block 814, a determination is made if the content location (e.g., URL) is included in the content ID. If the content location is included in the content ID, then a second determination is made in block 816 to verify that the content can be accessed from the system at that location. It is possible, for example, that the content could be accessed from the location where the content was identified 804, but is not available (or is no longer available) to be accessed from the system. If the content can be accessed from the system then the process is complete as shown in block 826.

If the content location is not included in the content ID or if the content location is included in the content ID but cannot be accessed by the playback system, then, as shown in block 818, the information in the content ID is used to search for the content among the available resources for the system. For example, the system may use Internet search tools to look for the audio content matching the information in the content ID. In another example, the system may search online streaming services for the content. As shown in block 820, it is determined whether the content is available. If the content is located, and the user has access to listen to the content at that location, then the content is added to the playback queue with the new location as shown in block 824. Once the playback queue has been updated, the process is complete as shown in block 826.

If the content is unable to be located or if the content is located but unable to be played by the system, then an indication is provided to the user that the content is not currently available as shown in block 822. For example, the user may be notified by a visual notification on the display screen of a controller, such as the controller shown in FIGS. 3 and/or FIG. 5. Once an indication is provided to the user that the content is not currently available, the process is complete as shown in block 826.

IX. Example System to Facilitate Identification and Transfer of Content

FIG. 9 depicts an example system 900 to facilitate identification and transfer of content to a playback network. The example system 900 includes a mobile device 910, a network 920, a content repository 930, and a playback system 940. In certain embodiments, when a user starts the mobile device 910 as a controller (e.g., a standalone controller device, an application running on a smart phone, tablet computer, laptop computer, personal computer, or other computing device) to remotely add content, the mobile device 910 controller establishes a link to a server (e.g., a SONOS® Server) in the cloud and/or other network-accessible medium. For example, the device 910 is configured with the Internet Protocol (IP) address to contact to retrieve the content.

During registration, a user may be asked if a "remote add" feature is to be enabled. If true, an IP address of a cloud-based and/or other network 920 server can be maintained for remote add and storage, for example. In certain embodiments, playback networks 940 (e.g., household networks) that support "Remote Add" or "Remote Play" are aware of the cloud or other network address 920 and can update their contact information (e.g., an IP address of a network-attached storage (NAS) server) with the cloud-based server.

In certain embodiments, the controller 910 can query the cloud to retrieve a list of groups and a corresponding playback network 940 (e.g., household) to which the user is subscribed. The controller 910 displays the list of active groups to which the user is subscribed (e.g., disabling inactive groups). For example, a user may have one or more personal groups (e.g., a home group, an office group, etc.) and/or one or more friend/acquaintance groups. The user selects a target network 940 (e.g., a target household) where the selected audio/video is to be added. The network 940 may be an active network. In certain embodiments, the network 940 may be an inactive network for which content may be added to the cloud for later relay to the network when active. The cloud server 920 can then return contact information of the target playback network to the user controller 910, enabling the controller 910 to communicate with the target playback network 940 to facilitate transfer of content and/or content identification from a repository holding the content 930 and the playback system 940.

Thus, certain embodiments provide remote addition, playback, configuration, etc., of media content to a playback system. Certain embodiments allow a user to see and/or hear content from outside his or her playback network and bring back or add that content for local playback.

X. Conclusion

As discussed above, systems, methods, apparatus, and articles of manufacture are provided to offer a unique wired, wireless, or both wired and wireless audio solution that allows content, or pointers to content, to be added to a playback queue from a remote location, whereby the playback queue may contain possibly a mix of tracks or songs, albums, playlists, radio stations, programs, or other streaming content. Other embodiments described herein include adding content, or pointers to content, to a playback queue upon return to the playback network from where the content was originally discovered. Regardless of when the content is added to the playback queue, the embodiments described herein allow for discovery of audio, and music in particular, outside of the range of the playback network. The embodiments attempt to prevent or reduce lost opportunities associated with the discovery of audio at locations outside of the regular playback network. As a result, audio can more readily be discovered in a club, at a restaurant, in a theater, at work, in a car, at the mall, in a park, at a coffee shop, with friends, or wherever else audio can be discovered. In some instances, the audio itself does not have to be heard by the user to be discovered, but could be discovered by a suggestion from a person or read, for example.

In one example, a method is provided that comprises facilitating identification of multimedia content being played, the identification including at least one of a content identifier associated with the content and the content itself, and relaying at least one of the content identifier and the content to a playback system located remotely from a location of the multimedia content, at least one of the content identifier and the content remotely added for playback at the playback system. The method further comprising checking with the playback system to determine if the content is already available for playback at the playback system and, if the content is not already available for playback, facilitating access to the content at the playback system.

In yet another example, a multimedia playback device is provided comprising of a wireless communication interface and a processor. The wireless communication interface communicates with a local playback network and a multimedia content source. The processor facilitates identification of multimedia content being played, the identification including at least one of a content identifier associated with the content and the content itself, and relays at least one of the content identifier and the content to a playback system located remotely from a location of the multimedia content playback, and at least one of the content identifier and the content is remotely added for playback at the playback system.

The description discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware. The invention claimed is:

The invention claimed is:

1. A method performed by a cloud-based computing system, the method comprising:

receiving first authentication data comprising identification information corresponding to a first playback device;

authenticating the first playback device as part of a playback network based at least in part on the identification information corresponding to the first playback device;

storing the identification information corresponding to the first playback device;

authenticating a controller to add content to a playback queue based on second authentication data received from the controller, wherein the playback queue identifies content to be played back by the first playback device, wherein the second authentication data is different than the first authentication data, and wherein the playback queue is stored at the cloud-based computing system;

receiving, from the controller, an instruction to add a first content identifier to the playback queue at the cloud-based computing system; and after authenticating the controller and receiving the instruction to add the first content identifier to the playback queue at the cloud-based computing system: (A) adding the first content identifier to the playback queue at the cloud-based computing system; and (B) using the identification information corresponding to the first playback device to transmit one or more messages that collectively cause the first playback device to (i) obtain, from the cloud-based computing system, one or more content identifiers that are in the playback queue at the cloud-based computing system, wherein the one or more content identifiers comprise the first content identifier, (ii) while the first playback device is authenticated as part of the playback network, use at least one of the one or more content identifiers in the playback queue to retrieve at least one content item from a cloud-based content service, and (iii) play back the at least one content item retrieved from the cloud-based content service.

2. The method of claim 1, wherein the identification information corresponding to the first playback device comprises contact information of the playback network comprising the first playback device.

3. The method of claim 2, wherein the contact information of the playback network comprises a household identifier.

4. The method of claim 2, wherein the contact information of the playback network comprises an internet protocol address.

5. The method of claim 1, wherein the identification information corresponding to the first playback device comprises one or more configuration parameters of a playback network that comprises the first playback device, wherein the one or more configuration parameters comprise at least one of a channel parameter, a service set identifier (SSID) parameter, or a wired equivalent privacy (WEP) key.

6. The method of claim 1, wherein the identification information corresponding to the first playback device comprises identification information corresponding to a group of playback devices that comprises the first playback device.

7. The method of claim 1, wherein receiving first authentication data comprising identification information corresponding to the first playback device comprises:

receiving the identification information corresponding to the first playback device from the controller.

8. The method of claim 1, wherein receiving first authentication data comprising identification information corresponding to the first playback device comprises:

receiving the identification information corresponding to the first playback device from the first playback device.

9. The method of claim 1, wherein authenticating the controller to add content to the playback queue based on second authentication data received from the controller comprises:

obtaining, from the controller, data indicating a username and password combination for the controller.

10. The method of claim 1, wherein authenticating the controller to add content to the playback queue based on second authentication data received from the controller comprises:

identifying a control application being used on the controller.

11. The method of claim 1, wherein authenticating the controller to add content to the playback queue based on second authentication data received from the controller comprises:

obtaining, from the controller, data indicating that the first playback device shall be enabled for use in connection with the playback queue.

12. The method of claim 1, wherein using the identification information corresponding to the first playback device to transmit one or more messages that collectively cause the first playback device to obtain, from the cloud-based computing system, one or more content identifiers that are in the playback queue at the cloud-based computing system comprises:

sending, from the cloud-based computing system to the first playback device, one or more content identifiers that are in the playback queue.

13. The method of claim 1, wherein the at least one content item retrieved from the cloud-based content service comprises a first content item, and wherein the method further comprises, after transmitting the one or more messages that collectively cause the first playback device to play back the at least one content item retrieved from the cloud-based content service:

receiving, from the controller, data indicating an instruction to add a second content identifier to the playback queue, wherein the second content identifier corresponds to a second content item available from the cloud-based content service; and after receiving the data indicating the instruction to add the second content identifier to the playback queue, modifying the playback queue, wherein modifying the playback queue comprises storing the second content identifier in the playback queue.

14. The method of claim 13, further comprising, after modifying the playback queue:

causing the first playback device to (i) obtain, from the cloud-based computing system, the second content identifier in the playback queue at the cloud-based computing system, (ii) use the second content identifier to retrieve the second content item from the cloud-based content service, and (iii) play back the second content item.

15. The method of claim 1, wherein at least one of the one or more content identifiers comprises a uniform resource identifier (URI).

16. The method of claim 1, wherein at least one of the one or more content identifiers comprises metadata associated with a content item.

17. The method of claim 16, wherein the metadata comprises at least one of a timestamp corresponding to the content item, a location corresponding to playback of content, a message associated with the content item, a name of the content item, and a content tag.

18. The method of claim 1, wherein at least one of the one or more content identifiers comprises a song ID.

19. The method of claim 1, wherein the playback queue is a first playback queue, and wherein the method further comprises:

creating a second playback queue at the cloud-based computing system for the playback network comprising the first playback device, wherein the second playback queue comprises one or more content identifiers corresponding to content items available from the cloud-based content service.

20. The method of claim 19, wherein the playback network further comprises a second playback device, and wherein the method further comprises:

causing the second playback device to (i) obtain, from the cloud-based computing system, one or more content identifiers that are in the second playback queue at the cloud-based computing system, (ii) while the second playback device is authenticated as part of the playback network, use at least one of the one or more content identifiers in the second playback queue to retrieve at least one content item from the cloud-based content service, and (iii) play back the at least one content item obtained from the cloud-based content service.

21. Tangible, non-transitory computer-readable media having program instructions stored therein, wherein the program instructions, when executed by one or more processors, cause a cloud-based computing system to perform functions comprising:

receiving first authentication data comprising identification information corresponding to a first playback device;

authenticating the first playback device as part of a playback network based at least in part on the identification information corresponding to the first playback device;

storing the identification information corresponding to the first playback device;

authenticating a controller to add content to a playback queue based on second authentication data received from the controller, wherein the playback queue identifies content to be played back by the first playback device, wherein the second authentication data is different than the first authentication data, and wherein the playback queue is stored at the cloud-based computing system;

receiving, from the controller, an instruction to add a first content identifier to the playback queue at the cloud-based computing system; and after authenticating the controller and receiving the instruction to add the first content identifier to the playback queue at the cloud-based computing system: (A) adding the first content identifier to the playback queue at the cloud-based computing system; and (B) using the identification information corresponding to the first playback device to transmit one or more messages that collectively cause the first playback device to (i) obtain, from the cloud-based computing system, one or more content identifiers that are in the playback queue at the cloud-based computing system, wherein the one or more content identifiers comprise the first content identifier, (ii) while the first playback device is authenticated as part of the playback network, use at least one of the one or more content identifiers in the playback queue to retrieve at least one content item from a cloud-based content service, and (iii) play back the at least one content item retrieved from the cloud-based content service.

22. A cloud-based computing system comprising:

one or more processors; and tangible, non-transitory computer-readable media having program instructions stored therein, wherein the program instructions, when executed by the one or more processors, cause the cloud-based computing system to:

receive first authentication data comprising identification information corresponding to a first playback device;

authenticate the first playback device as part of a playback network based at least in part on the identification information corresponding to the first playback device;

store the identification information corresponding to the first playback device;

authenticate a controller to add content to a playback queue based on second authentication data received from the controller, wherein the playback queue identifies content to be played back by the first playback device, wherein the second authentication data is different than the first authentication data, and wherein the playback queue is stored at the cloud-based computing system;

receive, from the controller, an instruction to add a first content identifier to the playback queue at the cloud-based computing system; and after authenticating the controller and receiving the instruction to add the first content identifier to the playback queue at the cloud-based computing system: (A) add the first content identifier to the playback queue at the cloud-based computing system; and (B) use the identification information corresponding to the first playback device to transmit one or more messages that collectively cause the first playback device to (i) obtain, from the cloud-based computing system, one or more content identifiers that are in the playback queue at the cloud-based computing system, wherein the one or more content identifiers comprise the first content identifier, (ii) while the first playback device is authenticated as part of the playback network, use at least one of the one or more content identifiers in the playback queue to retrieve at least one content item from a cloud-based content service, and (iii) play back the at least one content item retrieved from the cloud-based content service.

23. A system comprising a cloud-based computing system and a first playback device, wherein:

the cloud-based computing system comprises a first set of one or more processors, and first tangible, non-transitory computer-readable media having first program instructions stored therein, wherein the first program instructions, when executed by the first set of one or more processors, cause the cloud-based computing system to: (i) receive first authentication data comprising identification information corresponding to the first playback device; (ii) authenticate the first playback device as part of a playback network based at least in part on the identification information corresponding to the first playback device; (iii) store the identification information corresponding to the first playback device; (iv) authenticate a controller to add content to a playback queue based on second authentication data received from the controller, wherein the playback queue identifies content to be played back by the first playback device, wherein the second authentication data is different than the first authentication data, and wherein the playback queue is stored at the cloud-based computing system; (v) receive, from the controller, an instruction to add a first content identifier to the playback queue at the cloud-based computing system; and (vi) after authenticating the controller and receiving the instruction to add the first content identifier to the playback queue at the cloud-based computing system: (A) add the first content identifier to the playback queue at the cloud-based computing system; and (B) use the identification information corresponding to the first playback device to transmit one or more messages that collectively cause the first playback device to obtain and playback at least one content item from a cloud-based content service; and the first playback device comprises a second set of one or more processors, and second tangible, non-transitory computer-readable media having second program instructions stored therein, wherein the second program instructions, when executed by the second set of one or more processors, cause the first playback device to, after receiving, from the cloud-based computing system, the one or more messages that collectively cause the first playback device to obtain and playback the at least one content item from the cloud-based content service: (i) obtain, from the cloud-based computing system, one or more content identifiers that are in the playback queue at the cloud-based computing system, wherein the one or more content identifiers comprise the first content identifier, (ii) while the first playback device is authenticated as part of the playback network, use at least one of the one or more content identifiers in the playback queue to retrieve at least one content item from the cloud-based content service, and (iii) play back the at least one content item retrieved from the cloud-based content service.

* * * * *